(12) United States Patent
Roche et al.

(10) Patent No.: US 6,859,800 B1
(45) Date of Patent: Feb. 22, 2005

(54) SYSTEM FOR FULFILLING AN INFORMATION NEED

(75) Inventors: Emmanuel Roche, Belmont, MA (US); Yves Schabes, Newton, MA (US)

(73) Assignee: Global Information Research and Technologies LLC, Boston, MA (US)

( * ) Notice: Subject to any disclaimer, the term of this patent is extended or adjusted under 35 U.S.C. 154(b) by 0 days.

(21) Appl. No.: 09/559,223

(22) Filed: Apr. 26, 2000

(51) Int. Cl.[7] .............................................. G08B 17/30
(52) U.S. Cl. ................... 707/3; 707/4; 707/10
(58) Field of Search .............................. 707/3, 4, 10, 5

(56) References Cited

U.S. PATENT DOCUMENTS

| | | | |
|---|---|---|---|
| 5,303,361 A | * 4/1994 | Colwell et al. | 707/4 |
| 5,535,382 A | 7/1996 | Ogawa | 395/600 |
| 5,594,641 A | 1/1997 | Kaplan et al. | 395/601 |
| 5,721,902 A | 2/1998 | Schultz | 395/604 |
| 5,724,571 A | 3/1998 | Woods | 395/605 |
| 5,757,983 A | 5/1998 | Kawaguchi et al. | 382/305 |
| 5,778,361 A | * 7/1998 | Nanjo et al. | 707/5 |
| 5,826,260 A | 10/1998 | Byrd, Jr. et al. | 707/5 |
| 5,930,809 A | * 7/1999 | Middlebrook | 715/501.1 |
| 5,933,822 A | 8/1999 | Braden-Harder et al. | 707/5 |
| 5,953,718 A | * 9/1999 | Wical | 707/5 |
| 5,963,940 A | 10/1999 | Liddy et al. | 707/5 |
| 6,006,221 A | 12/1999 | Liddy et al. | 707/5 |
| 6,006,222 A | * 12/1999 | Culliss | 707/5 |
| 6,009,422 A | 12/1999 | Ciccarelli | 707/4 |
| 6,009,459 A | 12/1999 | Belfiore et al. | 709/203 |
| 6,026,388 A | 2/2000 | Liddy et al. | 707/1 |
| 6,028,601 A | 2/2000 | Machiraju et al. | 345/336 |
| 2001/0044720 A1 | * 11/2001 | Lee et al. | 704/251 |

FOREIGN PATENT DOCUMENTS

| | | |
|---|---|---|
| EP | 0 631 244 A3 | 12/1994 |
| EP | 0 631 244 A2 | 12/1994 |
| WO | WO 98/25217 | 6/1998 |

OTHER PUBLICATIONS

Bahe et al. (Optimised phrase querying and browsing of large text database), Jan. 29, 2001–Feb. 4, 2004, Computer Science Conference, 2001. ACSC 2001. Proceedings. 24th Autralasian, p. 12.*
Iselin et al. (Beyond the Basic, The Dialog Corportion) 2998.*
Giuseppe Attardi and Cristian Burrini, The PISAB Question Answering System.
Béatrice Bouchou and Denis Maurel, Using Transducers in Natural Language Database Query.

* cited by examiner

Primary Examiner—Jean M. Corrielus
Assistant Examiner—Baoquoc N. To
(74) Attorney, Agent, or Firm—Choate, Hall & Stewart

(57) ABSTRACT

The invention offers new approaches to fulfilling an information need, in particular to finding a result for a query based on a large body of information such as a collection of documents. The invention accepts a query containing an unspecified portion that expresses the information need. The invention locates matches for the query within a body of information and returns the matches or portions thereof in addition to or instead of identifiers for documents in which the matches are found. The invention ranks the matches in order to provide the most relevant information. One preferred method of ranking considers the number of instances of a match among a plurality of documents. The invention further defines a new type of index that includes contexts in which terms occur and provides methods of searching such indices to fulfill an information need.

17 Claims, 17 Drawing Sheets

```
Query:      Windows_
Results:
         1.  Windows 95
                           document23.html
                           document39.html
                           document76.html
                           document9.html
                           document11.html
         2.  Windows 98
                           document65.html
                           document3.html
                           document9.html
                           document345.html
         3.  Windows NT
                           document96html
                           document43html
                           document66html
         4.  Windows 2000
                           document2.html
```

Query: presidential candidates

WEB RESULTS  Top 10 Matches  next >>

1. Politics1- The #1 Net Guide to American Politics, Candidates & Parties
Your complete directory of U.S. candidates, elections, political parties, news, issues, political memorabilia and more. Political links, candidates, news, analysis, parties,
http://www.politics1.com/
See results from this site only.

2. Politics1: Presidency 2000 - The Presidential Candidates
Your complete directory to the candidates for President in 2000. Democrats, Republicans & Third Party hopefuls.
http://www.politics1.com/p2000.htm
See results from this site only.

3. WhiteHouse 2000 (the presidential campaign)
WhiteHouse 2000: links to the candidates; campaign updates, polls, humor, and resources; and presidential campaign history.
http://www.niu.edu/newsplace/whitehouse.html
See results from this site only.

4. Presidential Campaign Rhetoric 2000
Analysis of campaign rhetoric from remarks and speeches by the candidates for president--a resource for voters, students, news media, and politicians.
http://cctr.umkc.edu/~acline/c2000/page1.html
See results from this site only.

5. The Conservative Activist's Home Page
The Conservative Action Kit: Use these powerful lobbying tools for less government and lower taxes. Send e-mail to Congress, talk shows, and newspaper editors! Visit the RIGHT
http://www.conservativeusa.org/pres2000.htm
See results from this site only.

6. Presidential Candidates For The New Millennium
This page does necessarily endorse any particular candidate. It merely provides a resource of information on as many candidates as we could find on the 'Net. If your candidate is
http://www.greyhawkes.com/ps/candidates.html
See results from this site only.

7. 2000Vote.com Internet Guide to the 2000 elections
Internet Guide and discussion of the 2000 elections for President, Congress and State offices
http://www.2000vote.com/
See results from this site only.

next >>

FIGURE 1

Query: *Windows_*

Results:
1. *Windows 95*
   document23.html
   document39.html
   document76.html
   document9.html
   document11.html
2. *Windows 98*
   document65.html
   document3.html
   document9.html
   document345.html
3. *Windows NT*
   document96tml
   document43tml
   document66tml
4. *Windows 2000*
   document2.html

FIGURE 6

Query: Microsoft Windows _

Results:
1. Microsoft Windows 95
2. Microsoft Windows NT
3. Microsoft Windows browser
4. Microsoft Windows 98
5. Microsoft Windows Update
6. Microsoft Windows 2000

Query: · _ *2000*

Results:
1. Year 2000
2. Windows 2000
3. election 2000
4. president 2000
5. Expo 2000
6. Spring 2000

FIGURE 7

Query: Microsoft _ 2000

Results:
1. Microsoft Office 2000
2. Microsoft Windows 2000

FIGURE 8

Query: Microsoft Windows _ [NUM]

Results:
| | | |
|---|---|---|
| 1. | Microsoft Windows 95 | 200 |
| 2. | Microsoft Windows 98 | 100 |
| 3. | Microsoft Windows 2000 | 50 |

FIGURE 9

Query: Windows _[NUM] _

Results:
1. Windows 95 drivers
2. Windows 2000 software
3. Windows 98 information

FIGURE 10

Query: Alexander Graham Bell invented _ [NP]

Results:
1. Alexander Graham Bell invented the telephone

FIGURE 11

SYSTEM FOR FULFILLING AN INFORMATION NEED

BACKGROUND OF THE INVENTION

1. Field of the Invention

The present invention relates to an apparatus and accompanying methods for a system that accepts a query and fulfills an information need expressed by the query based on a body of information such as a collection of documents. The invention has particular utility in connection with text indexing and retrieval systems, such as retrieval of information from the World Wide Web.

2. Description of the Related Art

With the rapid growth in the amount of information available in the form of documents stored in databases has come an increased need to efficiently extract information relevant to a specific need. Traditional searching methods search and retrieve documents according to the words in a given input query. Search engines allow users to find documents containing one or more words or phrases, often referred to as keywords, found in the input query and return a list of relevant documents for the input query. For instance, with traditional search and retrieval methods, the input query Clinton congress returns the most relevant documents containing the word Clinton or the word congress or both words. Search engines may also permit the formulation of Boolean queries, which allow words in the query to be combined using logical operations such as AND, OR, and NOT. For example, using a traditional Boolean search engine, the query Clinton AND congress AND (NOT Hillary)

selects documents that contain the word Clinton and the word congress but that do not contain the word Hillary.

Another feature often found in queries used with traditional search engines is the ability to trigger a search for phrases in documents. For example the query "Bill Clinton"

retrieves documents that contain the exact phrase Bill Clinton while rejecting documents that contain the word Bill and/or the word Clinton separately. Examples of search engines offering these capabilities are search engines used with the World Wide Web such as Alta Vista™, Lycos™, Inktomi™, InfoSeek™, NorthernLight™, HotBot™, MSN Search™, Google™ and Yahoo!™. Additional search engines include those used for searching documents found in databases, digital libraries or other information sources such as InfoSeek UltraSeek Server™.

The result of a search using search engines such as those mentioned above is a list of relevant documents, generally displayed in some order, for example, from the most relevant document to the least relevant document. To present documents in an order, search engines rank the documents according to some metric. Typically, the ranking will first show documents containing the highest number of keywords. For example, FIG. 1 shows the result of a search on HotBot™ (http://www.hotbot.com) for the query presidential candidates. FIG. 1 shows the first 10 documents ranked from the most relevant document to the least relevant document. Each of the results consists of a description of a document. Such description includes the title of the document, a description of the document, and its Internet Uniform Resource Locator (URL).

Many conventional search engines, and World Wide Web search engines in particular, suffer from a drawback in that they only allow for a fully specified query and do not allow for queries where a portion can be wholly or partly unspecified. For example, when the phrase Alexander Bell is searched using traditional technologies, all documents containing the phrase Alexander Bell will be returned. However, documents which contain the phrase Alexander Graham Bell will not be returned because the phrase Alexander Graham Bell is different than the phrase Alexander Bell specified in the query. Similarly, if one employs the Boolean query Alexander AND Bell to search for documents, the result of the search will include documents that contain the words Alexander and Bell anywhere in the document, regardless of where they occur in relation to each other. Thus the search will return many documents that do not contain the information sought by a user. For example, the search will return documents that contain Alexander Heard and Packard Bell since such documents contain the words Alexander and Bell. Such documents are unlikely to be relevant to a search for documents about Alexander Bell. With most conventional search engines, as described above, it is not possible to search for the phrase Alexander followed by any word and followed by Bell, e.g., Alexander_Bell. Such a query should match documents that contain the string Alexander Graham Bell.

To provide more flexibility in searching, some search and query systems offer proximity operators. These operators allow a user to request that the words in the query be within a certain distance of each other in a document. For example, a query using the NEAR operator (a feature of the Alta Vista™ search engine) retrieves documents that contain the search terms within 10 words of each other. Thus a user seeking to learn the middle name of Alexander Bell could enter a query such as Alexander NEAR Bell This query will retrieve documents containing any of the strings Alexander Bell, Alexander Graham Bell, Alexander Heard and Packard Bell, Alexander heard the bell, Alexander Frederick Edward Bell, among others. Note that these strings contain several types of words such as verbs, determiners, etc., in addition to names. Thus the query results still suffer from a lack of specificity. Certain search and query systems such as DIALOG® allow a further refinement in that the user may request that the search terms occur within a given distance of each other within a document. For example, the (3W) operator requests that the search terms occur within three words of each other. This option offers more control over the query results but still retrieves documents based on the positional relationship of the search terms within the document, regardless of the actual content of the intervening text. Although reducing the number of intervening terms may reduce the number of irrelevant documents retrieved, in the case of many queries it may also result in failure to retrieve relevant documents.

Furthermore, the query structure available in traditional search and query systems is not conducive to searching for information that may lie outside the bounds of the search terms. For example, a user who has forgotten the last name of George Washington Carver (an agricultural chemist and holder of U.S. Pat. Nos. 1,522,176 and 1,541,478) could conduct a search using the specified terms George and Washington. While yielding hundreds of documents related to George Washington, such a search would be unlikely to provide the desired information about George Washington Carver. There is no way for a user to include both fully specified terms such as George and Washington in the query in addition to clearly indicating a desire to retrieve a particular unspecified element, such as a term that follows the specified terms.

Another area in which conventional searching systems are limited is in their ability to search effectively for phrases. In prior art systems, identifying documents that contain phrases requires either indexing the phrases as single terms or identifying documents that contain the individual terms, locating the terms, and determining their positional relationship to each other. Indexing phrases as single terms is generally limited to phrases of two or at most three terms, and it is not feasible to index all or even a majority of phrases. Also, in order to provide information about the terms adjacent to or surrounding a phrase of interest, prior art systems must access the document that contains the phrase.

In addition to the limitations discussed above, conventional searching systems suffer from a major drawback in that they typically provide only names, titles, URLs, file names, or identifiers of documents in response to a query. For example, conventional Web search engines provide only the name of a document containing a search term, together with a uniform resource locator (URL) for that document. The user must then access and examine the document in order to locate the desired information. Especially in the case of a large database such as the World Wide Web, this can be a significant burden, particularly if the query structure does not permit the user to accurately indicate what information is needed. Even in the case of those search engines that return a passage of text that includes the query terms in addition to returning an identifier for the document in which the text appears, the user may still need to scan through many such passages to locate desired information. Since it is not possible to place any restrictions on the text between or around the search terms, the user is likely to encounter a great deal of material that is irrelevant to the actual information desired. Furthermore, results are returned on a document by document basis. The order of the documents is frequently based on the number of occurrences of the search terms within each document. Traditional search and query systems do not perform an assessment of the results of the query across multiple documents. Thus the results provided by traditional search and query systems do not consider the information content of the database as a whole.

There exists a significant need for a search and query system that overcomes the various limitations described above. In particular, there is a need for a system that accepts a partially unspecified query and returns the actual text that matches the query, in addition to or instead of the list of documents that contain a match for the specified portion of the query. For example, there is a need for a search system that accepts the partially unspecified query Alexander_Bell and returns the middle name Graham or the string Alexander Graham Bell instead of or in addition to the list of documents which match the partially unspecified query. As another example, there is a need for a search system that accepts the partially unspecified query Microsoft Windows_, and returns the strings Microsoft Windows 95, Microsoft Windows 98, Microsoft Windows NT, and Microsoft Windows 2000 in addition to or instead of the list of documents that match the query. Furthermore, there is a need for a search and query system that accepts a partially unspecified query and allows the user to accurately indicate a specific information need by placing restrictions on the unspecified portion of the query. In addition, there is a need for an innovative approach to the tasks of searching for phrases and providing information about terms adjacent to the phrases.

Finally, when there are multiple different strings that match the partially unspecified query, there is a need to present those strings in a relevant order. In particular, there is a need for a search and query system that ranks the results based not on the contents of the individual documents that contain the search terms, but rather on the content of multiple documents. In other words, there is a need for a search system that considers the query in relation to the information available within a large body of information such as a large collection of documents rather than in relation to single documents.

SUMMARY OF THE INVENTION

The present invention addresses the foregoing needs by providing new approaches to the task of gathering information related to an information need based on a large body of information. Thus, in broad terms, the invention is a system (e.g., a method, apparatus, and computer-executable process steps) for fullfilling an information need. The invention identifies information to provide a result for a query containing an unspecified portion in addition to or instead of a specified portion. The unspecified portion of the query corresponds to an information need, for example, an item of information sought by a user. Thus rather than merely including defined terms that are related to an information need, a query containing an unspecified portion according to the present invention can more explicitly express the need. In particular, the query structure of the present invention facilitates accurate expression of the information need by permitting restrictions on the unspecified portion as described below. The invention then addresses the need by identifying matches for the query within documents. Instead of returning only document locations and/or identifiers and possibly document summaries as results for the query, the present invention returns the matches themselves or relevant portions of the matches (e.g., portions that correspond to the unspecified portion of the query). Document locations and/or identifiers and other information can optionally be returned in addition to the matches, and the documents themselves can be ranked. Furthermore, in preferred embodiments the invention ranks the results based on the occurrence of matches across a plurality of documents rather than on a document by document basis. The invention has particular utility in obtaining results for queries by searching documents on the World Wide Web.

In one aspect, the invention is a system (i.e., a method, apparatus, and computer-executable process steps) for obtaining a result for a query that contains one or more unspecified portions. The unspecified portion can be wholly unspecified, as in the query Alexander_Bell. In certain preferred embodiments of the invention the unspecified portion is only partially unspecified, in which case it includes a restriction that defines a category of terms that are acceptable matches for the unspecified portion. The restriction may indicate that an unspecified portion of a query must meet a category criterion, a morphological or syntactic criterion, or a criterion defined by a computer program. For example, the restriction may indicate that an unspecified portion of a query must be a name, date, noun phrase, etc. Thus the query Microsoft _[NUM] includes a partially unspecified portion with a restriction indicating that only phrases in which the word Microsoft is followed by a number should be identified as a valid match. The query Microsoft_[NP] includes a partially unspecified portion with a restriction indicating that only phrases in which the word Microsoft is followed by a noun phrase (e.g., Windows operating system, computer corporation, etc.) should be identified as valid matches. As indicated by this example, although according to the query syntax a partially unspecified portion is indicated by a single underscore character (in some cases followed by an associated restriction), the matching text may comprise multiple terms. For descriptive purposes the convention that a partially unspecified term is represented by an underscore character followed by a restriction will be adopted herein. For the sake of clarity the underscore and its associated restriction are generally separated by a blank within this document.

The system receives a query containing an unspecified portion. The system identifies matches for the query within a body of information. Typically the body of information comprises a body of text, which may be organized in the form of discrete documents. The invention preferably identifies a plurality of matches for the query and ranks the identified matches. The ranking is based on any of a variety of criteria. In preferred embodiments of the invention the ranking reflects the number of times an instance of the match is identified within the portion of the body of information that is searched. The matches are output, preferably in an order based on the ranking, to provide a result for the query. Additional information, such as a score for the match, can also be provided as part of the results. In certain embodiments of the invention rather than outputting the entire text of a match, only that portion of the match that corresponds to an unspecified portion of the query is output.

In certain embodiments of the invention a result for a query containing an unspecified portion is obtained based on the contents of documents in a database. In these embodiments, the system utilizes an index (e.g., an index stored in memory) identifying documents that contain terms. The index may also store the locations of the documents within a database (e.g., the URLs of the documents when the database comprises pages on the World Wide Web). In certain preferred embodiments of the invention the index also stores information identifying terms that satisfy restrictions and/or computer programs that define restrictions. For example, the index may store terms that meet the restriction [PROPER NAME], terms that meet the restriction [COUNTRY], terms that meet the restriction [NP] (noun phrase) among others.

When the system receives a query containing an unspecified portion, it uses the index to identify documents that contain matches for at least a portion of the query, e.g., documents that contain some or all of the terms in the query. The system then locates matches for the query within the identified documents. When the query includes an unspecified portion containing a restriction, the system uses the information identifying terms that satisfy the particular restriction and/or the computer programs that define restrictions to determine whether a potential match is indeed a match.

In certain embodiments of the invention, the system provides (i.e., outputs) some or all of the matches as a result for the query. Alternatively, the result may include a portion of a match that corresponds to an unspecified portion of the query rather than the entire match. In addition to providing matches (or portions thereof) as a result for the query, in certain embodiments of the invention the result also includes identifiers and/or locations for the documents containing the matches and, optionally, additional information about the match. The result can be provided to a user by displaying the matches or portions thereof, the document identifiers or locations, etc., in an appropriate format on a display screen. If a particular match appears in multiple documents, the documents in which that match is found may themselves be ranked, e.g., based on the number of times an instance of the match is located within a document.

As the system locates matches it preferably accumulates information related to the matches and, optionally information related to the documents that contain the matches. In certain embodiments of the invention a located match is assigned a score, and the match is stored in a match list together with the score. The score preferably reflects the number of times an instance of the match is identified among a plurality of documents. In certain embodiments of the invention, the system ranks the located matches. The ranking is preferably based on the content of a plurality of documents, e.g., the number of times an instance of the match is located among a plurality of documents. Additional information that is accumulated as the matches are located may also be used to assign a score to a match and/or to rank the matches. In certain preferred embodiments of the invention, the system outputs the results of the query in an order based on the ranking.

The invention further provides a system for obtaining a result for a query that contains one or more wholly or partially unspecified portions using a set of contexts obtained from documents in a database. The system stores information (e.g., an index) identifying a set of contexts for a term. The contexts correspond to strings containing the given term, the strings occurring within documents in the database. In certain preferred embodiments of the invention, the contexts are stored as finite state automata. In addition to storing the context itself, the system may also store additional information associated with the context, such as position of the context within a document. Such information may be stored as part of the finite state automaton that represents the context. The system locates matches for the query within the set of contexts rather than searching for matches within the documents themselves, thereby providing an opportunity for faster and more efficient processing of the query.

In certain preferred embodiments of the invention, as the system locates matches among the contexts it also accumulates information related to the matches. A located match is assigned a score, and the match is stored in a match list together with the score. In certain embodiments of the invention the score reflects the number of occurrences of the match among a plurality of contexts (and therefore among a plurality of documents). The system ranks the located matches, preferably based on the content of a plurality of contexts (and therefore also on the content of a plurality of documents). For example, the ranking can be based on the number of times an instance of a match is found across a plurality of contexts. Additional information that is accumulated as the matches are located may also be used to rank the matches. The system provides (i.e., outputs) the results of the query, preferably in an order based on the ranking.

In certain embodiments of the invention, the set of contexts for a term includes multiple subsets of contexts, each subset containing contexts in which the term is found in a given document. The system stores information identifying a document associated with each subset of contexts. The system locates matches for the query within the subsets of contexts associated with documents that contain some, or preferably all, of the specified terms in the query. As the system locates matches among the contexts it also accumulates information related to the matches. The system may also accumulate information related to the documents that contain matches for the query. The system ranks the located matches, preferably based on the content of a plurality of contexts. Additional information that is accumulated as the matches are located may also be used to rank the matches. The system provides (i.e., outputs) the results of the query, preferably in an order based on the ranking. In certain embodiments of the invention the results include identifiers and/or locations of the documents containing contexts that match the query and, optionally, additional information about the matches and/or documents.

In another aspect, the invention is a system for fulfilling an information need by searching contexts for one or more terms that appear in a query. The contexts are obtained from a body of information such as a collection of documents. The query may consist of fully specified terms or may be partially unspecified. The results for the query can comprise contexts themselves or portions thereof, in addition to or instead of document identifiers or locations. A key feature of the invention in this aspect is that rather than searching documents containing query terms, the system searches contexts that contain the terms.

In another aspect, the invention is a system for creating an index identifying contexts for terms, the contexts occurring within documents in a database. The system first selects a document in the database and then selects a term within the document. The system identifies contexts for the term within the document, the contexts corresponding to strings within the document that contain the term. Each identified context is added to a subset of contexts for that term, the subset consisting of those contexts that occur within the selected document. The system further stores information identifying the document and associating the document identifier with the context subset. Thus the set of contexts for a given term consists of multiple subsets of contexts, each subset of contexts occurring within a particular document. For a given term, in addition to storing the context subsets and associated document identifiers, the system stores information indicating the number of documents that contain the term and, for each document, the number of contexts containing the term. After identifying some, or preferably all, of the contexts for the term within a given document, the system selects another term within the document and identifies contexts for that term within the document. The context identification process continues for the selected document until a set of contexts has been identified for a plurality of terms (e.g., all the terms in the document or all the terms excluding determiners, etc.). The entire process is repeated for a plurality of documents in the database. In addition to storing the contexts themselves, in certain embodiments of the invention information about the contexts is also stored. Such information includes factors that may provide an indication of the significance of the context, such as the position of the context within the document, the age of the document in which the context appears, or the co-occurrence of certain words within the context. In certain embodiments of the invention the contexts are stored as finite state automata. Information about a context is stored within the finite state automaton that represents the context.

In certain embodiments of the system for creating an index identifying contexts for terms, the system does not store information identifying the document in which a context appears. The system selects a document in the database and then selects a term within the document. The system identifies contexts for the term within the document, the contexts corresponding to strings within the document that contain the term. Each identified context is added to a set of contexts for that term. The context identification process continues for the selected document until a set of contexts has been identified for a plurality of terms in the document. The entire process is repeated for a plurality of documents in the database. For a given term, in addition to storing the context subsets and associated document identifiers, the system stores information indicating the number of documents that contain the term. In certain embodiments of the invention the contexts are stored as finite state automata. Such information includes factors that may provide an indication of the significance of the context, such as the position of the context within the document, the age of the document in which the context appears, or the co-occurrence of certain words within the context. In certain embodiments of the invention the contexts are stored as finite state automata. Information about a context is stored within the finite state automaton that represents the context.

In another aspect, the invention is a data structure identifying subsets of contexts for terms, each subset of contexts occurring within a document in a database. The data structure includes a term array, a document array, and a context array. For a given term, the context array contains subsets of contexts, each subset consisting of contexts in which the term occurs within a document. The context array may also include, for each subset of contexts, information indicating the number of contexts in the subset. For a given term, the document array includes information identifying the documents within which the term appears. For a given document containing a given term, when the context array contains a subset of contexts corresponding to that term and document, the document array contains information for accessing, within the context array, the subset of contexts for the given term and document. For a given term, the term array includes the number of documents containing the term and information for accessing, within the document array, the document identifiers for documents that contain the term. In certain embodiments of the invention the contexts are stored as finite state automata.

In another aspect, the invention is a data structure identifying contexts for terms, the contexts occurring within documents in a database. The data structure includes a term array and a context array. For a given term, the context array contains a set of contexts in which the term occurs in documents in the database. The term array contains the number of contexts stored in the context array for the given term and also contains information for accessing the set of contexts for that term within the context array. In certain embodiments of the invention the contexts are stored as finite state automata.

BRIEF DESCRIPTION OF THE DRAWING

FIG. 1 shows an example of search results obtained using a traditional search system.

FIG. 6 shows an example of search results obtained in accordance with the present invention.

FIG. 7 shows an example of search results for the queries Microsoft Windows_and_2000 in accordance with the present invention.

FIG. 8 shows an example of search results for the query Microsoft_2000 in accordance with the present invention.

FIG. 9 shows an example of search results for the query Microsoft Windows_[NUM] in which the unspecified portion of the query is restricted to match only a number.

FIG. 10 shows an example of search results for the query Windows_[NUM] in which the unspecified portion includes a partially unspecified term and a wholly unspecified term.

FIG. 11 shows an example of search results for the query Alexander Graham Bell invented the _[NP] in which the unspecified portion of the query is restricted to match only a noun phrase.

DETAILED DESCRIPTION OF CERTAIN EMBODIMENTS

Figure 2:
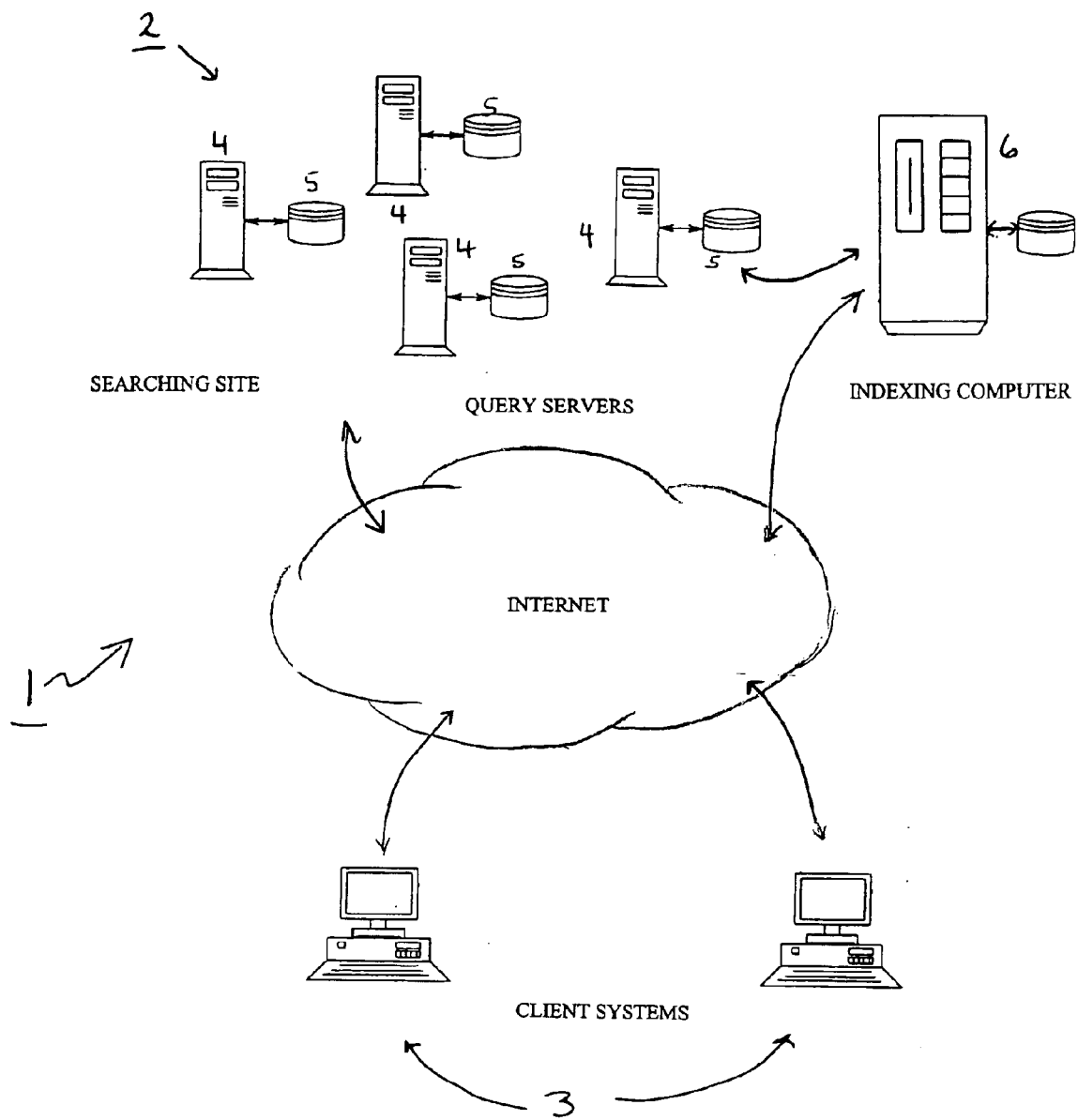
FIG. 2 shows a representative embodiment of a networked computer system that may be used to implement the present invention.

FIG. 2 shows a representative embodiment of a networked computer system 1 that may be used to implement the present invention. A searching site 2 is logically connected, via a network such as the Internet, to one or more client computer systems 3. Client computer system 3 can comprise any available computer but is typically a personal computer equipped with a processor, memory, display, keyboard, mouse, storage devices, and appropriate interfaces for these components. Client system 3 accepts a user-generated query and transmits the query to searching site 2. Preferably client system 3 operates a Web browser, and the query is entered into the Web browser that transmits the query to searching site 2. Searching site 2 may include one or more query servers 4, which may be logically connected to one another for example through a local area network, intranet, or the like. Query servers 4 may be connected to one or more peripheral storage devices 5. Searching site 2 also includes indexing computer 6, which is preferably also logically linked to the network and to query server(s) 4. In preferred embodiments of the invention indexing computer 6 collects documents and analyzes the documents to produce an index, as described in more detail below. Although for descriptive purposes the indexing and query fulfillment aspects of the invention are described as taking place on separate machines, the same machine can serve both functions.

Figure 3:
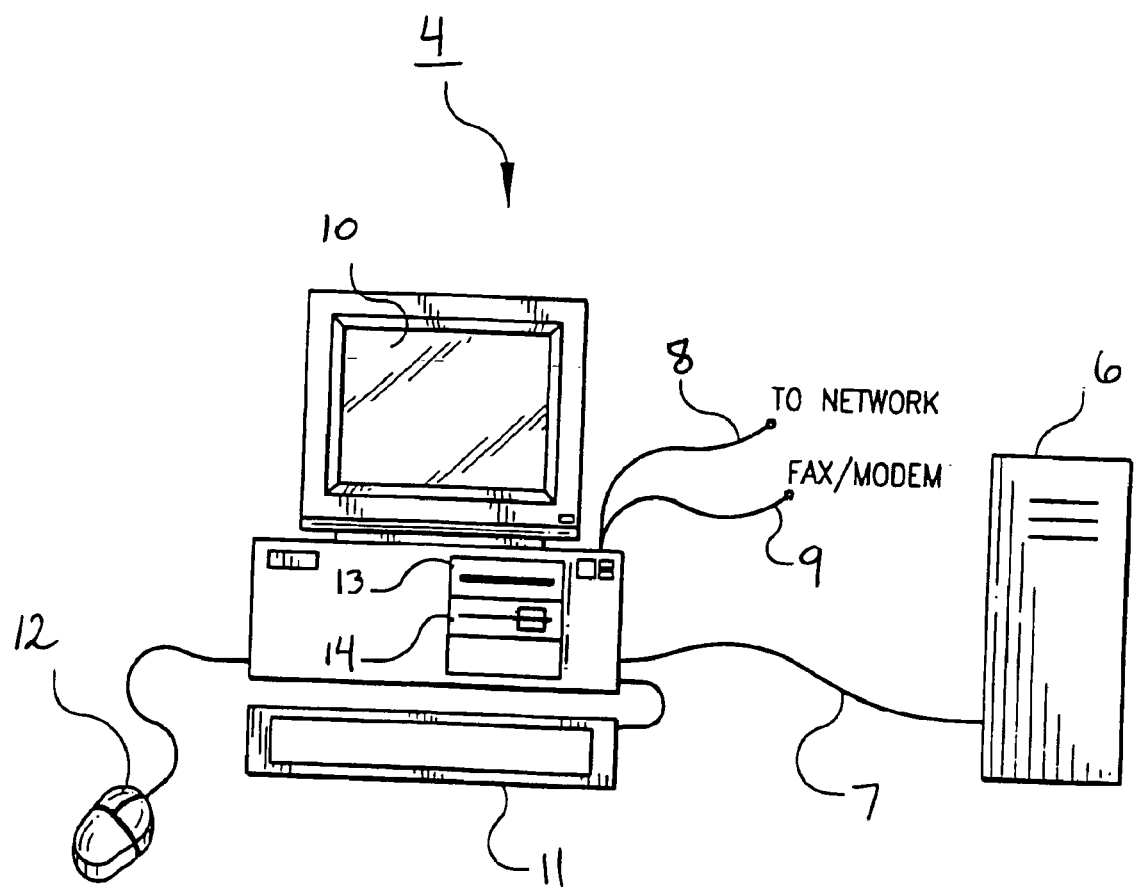
FIG. 3 is a perspective view of a query server of in the present invention.

A representative embodiment of query server 4 is shown in FIG. 3. Query server 4 includes a local area network connection 7 for interfacing to additional query server(s), indexing computer(s) 6, peripheral storage device(s), etc. Query server 4 also includes a general network connection 8 for interfacing to a network such as the Internet, and fax/modem connection 9 for interfacing with other remote sources. In certain embodiments of the invention query server 4 includes display screen 10 for displaying information, keyboard 11 for inputting text and user commands, mouse 12 for positioning a cursor on display screen 10 and for inputting user commands, disk drive 13 for reading from and writing to floppy disks installed therein, and CD-ROM drive 14 for accessing information stored on CD-ROM. As mentioned above, query server 4 may also have one or more peripheral storage devices attached thereto.

Figure 4:
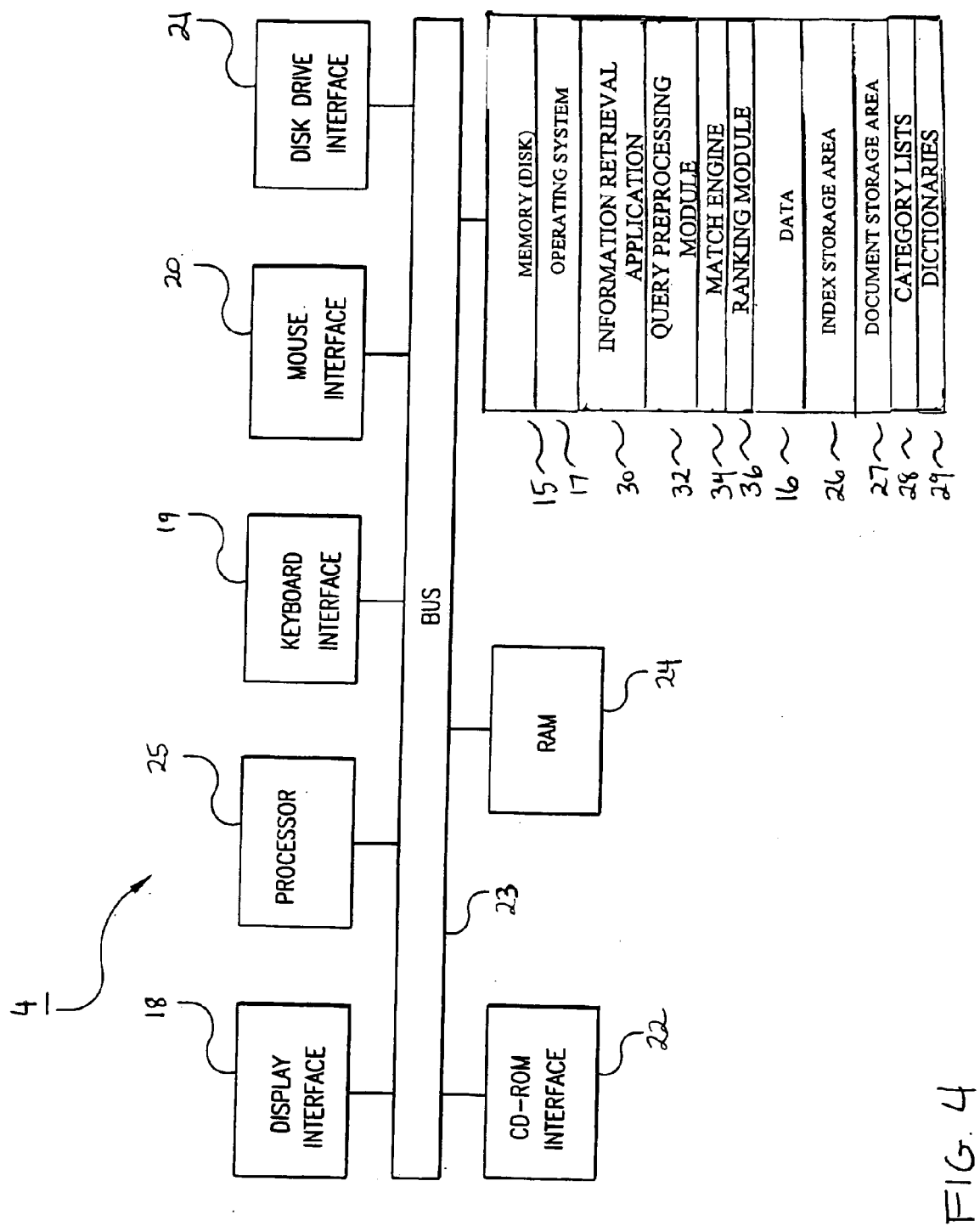
FIG. 4 shows the architecture of the query server shown in FIG. 2.

FIG. 4 shows the internal structure of query server 4. As shown in FIG. 4, query server 4 includes memory 15, which comprises one or more computer-readable media, such as a computer hard disk. Typically memory 15 comprises a hard disk, but it may comprise other storage media such as floppy disks, CD-ROMs or read/write CDs, RAM, or other devices known in the art. Memory 15 stores data 16, applications, and an operating system 17. Also included in certain embodiments of query server 4 are display interface 18, keyboard interface 19, mouse interface 20, disk drive interface 21, CD-ROM drive interface 22, computer bus 23, RAM 24, and processor 25. Processor 25 preferably comprises a microprocessor or the like for executing applications out of RAM 24. As noted above, these applications may be stored in memory 15 or, alternatively, on a floppy disk in disk drive 13 or a CD-ROM in CD-ROM drive 14. In this regard, processor 25 accesses applications (or other data) stored on a floppy disk via disk drive interface 21 and accesses applications (or other data) stored on a CD-ROM via CD-ROM drive interface 22.

Application execution and other tasks of query server 4 may be controlled and/or altered using keyboard 11 or mouse 12, commands from which are transmitted to processor 25 via keyboard interface 19 and mouse interface 20, respectively. Such tasks may also be controlled via commands transmitted to query server 4 via network connections 7, 8, or 9. Output results from some applications running on query server 4 may be processed by display interface 18 and then displayed to a user on display 10. To this end, display interface 18 preferably comprises a display processor for forming images based on data provided by processor 25 over computer bus 23, and for outputting those images to display 10. Certain applications may provide outputs to network interfaces 7, 8, or 9. In preferred embodiments of the invention query server 4 also includes index storage area 26 and document storage area 27. In, this regard it is noted that query server 4 optionally includes peripheral storage devices 5 that may include index and/or document storage areas 26 and 27. In certain embodiments of the invention data stored in memory 15 includes category lists 28, dictionaries 29, and index or indices 50 which are discussed further below.

Applications stored in memory 15 include information retrieval application 30. Information retrieval application 30 includes query module 32, match engine 34, and ranking module 36, which together comprise computer-executable process steps to accept a query and satisfy an information need expressed by the query based on a body of information such as a collection of documents in a database. Briefly, information retrieval application 30 receives a query and identifies matches for the query that occur within the body of information. In preferred embodiments of the invention as the application locates a match it gathers information about the match, assigns a score to the match, and stores the match and the associated score. Preferably the score is based on the number of times an instance of the match is identified within the body of information. In preferred embodiments of the invention information retrieval application 30 uses the score to rank the matches. The results for the query comprise the matches themselves or portions thereof. In addition, the results may include a list of documents in which a given match is found. Additional information such as the location of the documents and/or other information about the matches or the documents may be provided in the results. A detailed description of these process steps is provided below.

As noted above, in general a user-generated query is entered into a client system and transmitted to the searching site. However, in certain embodiments of the invention queries may also be entered directly into query server 4 or may be generated by an application program stored either on the query server or elsewhere. In a preferred embodiment of the invention, the body of information searched by information retrieval application 30 comprises a collection of Web pages. However, it is noted that the invention is not limited to searching Web documents and, in fact, can be used in conjunction with a variety of different types of documents and databases. Moreover, it is noted that although the invention will be described with respect to searching based on text/character strings, the invention is not limited to this either. That is, the invention may also be used to provide results for queries based on images or other types of data from any type of database.

In addition to information retrieval application 30, applications stored in memory 15 may include results page generator 38, which comprises computer-executable process steps to format and output search results in a variety of ways. In various embodiments of the invention, information obtained by information retrieval application 30 in response to the query can be provided to another application stored either on the query server or a connected computer, to a user of query server 4, or to a user at a remote location via network connection 7.

Figure 5:
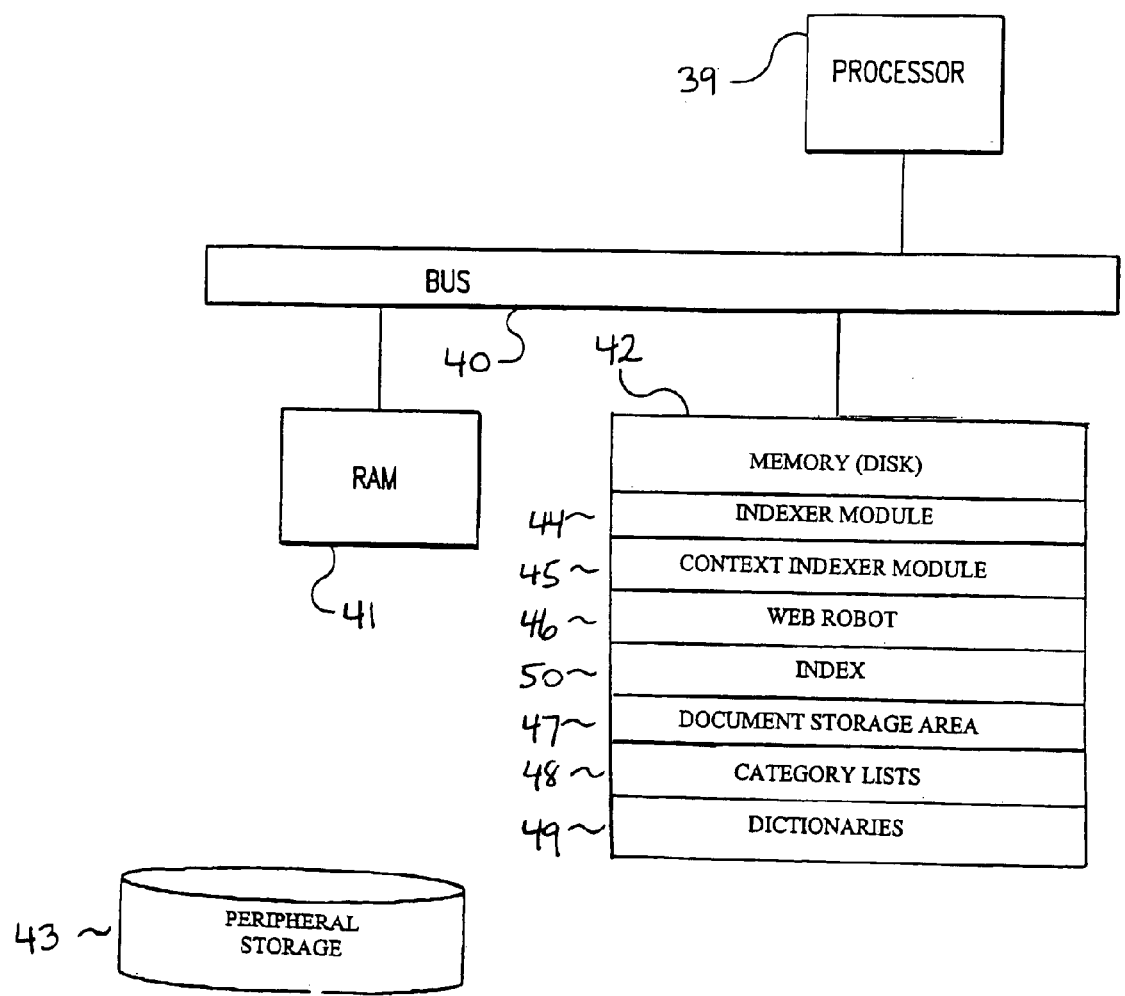
FIG. 5 shows a portion of the architecture of the indexing computer shown in FIG. 2.

FIG. 5 shows a portion of the internal structure of indexing computer 6. Indexing computer 6 comprises a processor 39, bus 40, RAM 41, memory 42, and optionally peripheral storage 43. Memory 42 comprises one or more computer-readable media such as a hard disk. Indexing computer 6 preferably includes a general network connection (not shown) for interfacing to a network such as the Internet and also a local area network connection (not shown) for interfacing to query servers 4. Applications stored in memory 42 include indexer module 44, which comprises computer-executable process steps to construct an index identifying documents containing terms. In certain embodiments of the invention, applications include context indexer module 45, which comprises computer-executable process steps to store contexts for terms. Other applications may include Web robot 46. In certain embodiments of the invention Web pages are used as a source of documents to be indexed by indexer module 44 and/or context indexer module 45. In this case Web robot 46 may periodically search the Web and retrieve Web pages. Web robot 46 can comprise any Web robot, of which a number are commercially available. Memory 42 can include document storage area 47, although of course documents can also be stored on peripheral storage 43. Data stored in memory 43 preferably includes category lists 48 and dictionaries 49. In preferred embodiments of the invention these are identical to category lists 28 and dictionaries 29 stored on query server(s) 4. In certain embodiments of the invention query servers 4 and indexing computer 6 access the same category lists and dictionaries. Index or indices 50 generated by indexing computer 6 are also preferably stored in memory 43. Although a single indexing computer has been described, it is noted that in practice the tasks associated with building an index are preferably distributed among multiple indexing computers.

In certain embodiments of the invention, indexer module 44 is based upon the indexer described in "The SMART Retrieval System: Experiments in Automatic Document Processing" by Gerald Salton (Prentice-Hall, Inc. (1971)) and "A Theory of Indexing" also by Gerald Salton (J. W. Arrowsmith, Ltd. (1975)). The contents of these two documents are hereby incorporated by reference into the subject application as if set forth herein in full. Indexer module 44 and context indexer module 46 are described in more detail below. Indices generated by indexer module 44 and/or context indexer module 46 may be copied to query servers 4 or to any storage device to which query servers 4 have access as may the documents themselves or portions thereof, either separately or as part of the index. It is noted that the foregoing description is intended by way of example and is not intended to be limiting. A variety of computer configurations are consistent with the present invention. The two functions of indexing and query fulfillment (i.e., obtaining a result for a query) may be divided in any of a number of ways among one or more computers.

We turn now in further detail to the query structure, searching approach, and results generation aspects of the present invention. As described in the Background, traditional search and query systems accept a query containing one or more specified terms and return a list of documents containing the terms as illustrated in FIG. 1. In this regard it is noted that a term, as used herein, refers to a sequence of characters, including letters and/or numbers. A query, as used herein, is a character string that consists of any number of terms separated by spaces and/or special symbols. In general, a query is issued by a user seeking specific information related to the term(s) in the query. Thus a query is an indication of an information need. It is presumed that documents in which the query terms occur are more likely to contain the desired information than documents that do not contain those terms. Traditional search and query systems expedite the process of obtaining information by identifying documents that contain the query terms. However, the documents themselves, or sections of the documents, must still be examined by a human user in order to obtain the desired information. Furthermore, in order to have confidence in the information, it may be necessary to examine numerous documents.

The present invention provides a new approach to the task of gathering information related to a query. The invention allows the processing of a query containing an unspecified portion in addition to or instead of a specified portion. The unspecified portion of the query corresponds to an information need, for example, an item of information sought by a user. Thus rather than merely including terms that are related to an information need, a query containing an unspecified portion according to the present invention can more explicitly express the need. As described in detail below, the invention then addresses the need by identifying matches for the query that occur within a body of information such as a collection of documents. Instead of returning only document locations and/or identifiers and possibly document summaries as results for the query, the present invention returns the matches themselves or portions of the matches that correspond to the unspecified portions of the query. Document locations and/or identifiers and other information can optionally be returned in addition to the matches.

In certain embodiments of the invention, the matches are ranked according to any of a variety of criteria. A general feature of the ranking criteria is that they are based on the content of a plurality of documents. One such criterion is the number of times an instance of the match is identified across all or a subset of documents in which the match occurs. (The words identifying and locating will be used interchangeably herein in reference to the process of finding a match or finding a context.) Thus ranking criteria of the present invention differ from criteria used in traditional search and query systems. Such systems may rank a given document based on the number of occurrences of the query term(s) within that document. In other words, in traditional systems documents in which the query terms appear with a high frequency receive a higher ranking than documents in which the query terms occur less frequently. In contrast, the present invention ranks matches for queries rather than ranking documents that contain query terms, and the ranking is based on the content of multiple documents. It is noted that the general strategies discussed herein, including identifying a match and/or a plurality of matches, assigning a score to the matches (e.g., a score based on the number of times an instance of the match is identified), and ranking the different matches based on the score are not limited to situations in which the matches are located within a plurality of documents. Instead, the strategies are also applicable to any body of information regardless of whether the information is in the form of discrete documents. Similarly, a query having the query structure of the present invention as described below, i.e., a query containing one or more wholly unspecified and/or one or more partially unspecified terms, may be used to identify matches within any body of information, including a single document as well as within a plurality of documents.

Turning now to the structure and features of a query, the present invention operates on partially unspecified queries, i.e., queries that contain an unspecified portion. The unspecified portion of a query may be represented by a special symbol such as an underscore within the query and may include one or more unspecified terms. As described below, an unspecified term may be wholly or partially unspecified. By way of example, the query Windows_ contains an unspecified portion. This query consists of two terms, of which the first is the specified (fully defined) term Windows. The second term (represented by an underscore) is unspecified and can represent any word, number, or other character sequence. Thus the unspecified portion of this query consists of a single unspecified term. A query containing an unspecified portion is matched to a character string when the following conditions are met:
(1) For each of the specified terms in the query, an equivalent (matching) term is located at the corresponding position in the character string.
(2) For each of the wholly unspecified terms in the query, a term (any term) is located at the corresponding position in the string.

Thus, the phrases Windows 95, Windows 98, Windows NT and Windows 2000 are all matches for the query Windows_.

FIG. 6 shows results for the query Windows_ according to one embodiment of the present invention. In this embodiment, the matches are ranked based on the number of documents that contain the match and are presented according to this order. Since the match Windows 95 occurs in the most documents (five) it is presented at the top of the list. The match Windows 2000 occurs in only one document and is therefore presented at the end of the list. Information identifying the document(s) in which a particular match occurs is also provided in the results.

The specified portion of the query can be of arbitrary length, i.e., can contain any number of terms. For example, FIG. 7 shows an example of results for the query Microsoft Windows_ in which the specified portion consists of two specified terms. Such a query matches the phrases Microsoft Windows 95, Microsoft Windows NT, and Microsoft Windows browser among others. An unspecified portion can occur at any position within the query. In the preceding example the unspecified portion (a single unspecified term) follows the specified portion. In contrast, FIG. 7 further shows an example of results for the query _2000 in which the unspecified portion (a single unspecified term) precedes the specified portion. Matches for this query include year 2000, Windows 2000, and election 2000 among others. FIG. 8 shows exemplary results for the query Microsoft_2000 in which the specified portion contains two terms that are separated by the unspecified portion (a single unspecified term).

As another example, the query

_Windows_ consists of two unspecified terms separated by the specified term Windows. This query matches the phrases Microsoft Windows 95, Microsoft Windows 98, installing Windows 95, and using Windows 98, among others.

In general, a term in a character string is equivalent to a specified term in a query if it is identical to the specified term. However, in certain embodiments of the invention a term may be considered as equivalent to a specified term even if the term is not identical to the specified term but is instead related to the specified term in some manner. For example, in certain embodiments of the invention morphologically related words such as leave and left may be considered as equivalent.

As described above, an unspecified term can represent any character sequence. Such an unspecified term is referred to herein as a wholly unspecified term. According to the present invention an unspecified portion of a query can contain one or more partially unspecified terms in addition to or instead of one or more wholly unspecified terms. A partially unspecified term includes a restriction that defines a particular set of character sequences that can match the term. For example, a restriction on a partially unspecified term may require that a matching term be a number, a proper name, a noun phrase, etc. By way of example, the queries Microsoft Windows_[NUM] and Agatha Christie was born in _[NUM]

contain a partially unspecified term with a restriction indicating that only a number can satisfy the restriction and therefore match the term. A query containing a partially unspecified portion is matched to a string when the following conditions are met:
(1) For each of the specified terms in the query an equivalent (matching) term is located at the corresponding position in the string.
(2) For each of the wholly unspecified terms in the query a term (any term) is located at the corresponding position in the string.
(3) For each of the partially unspecified terms in the query a term or a group of terms that satisfies the restriction associated with the partially unspecified term is located at the corresponding position in the string.

FIG. 9 shows an example of results for the query Microsoft Windows_[NUM]. As shown in the Figure, the phrases Microsoft Windows 95, Microsoft Windows 98, and Microsoft Windows 2000 are matches for the query. However, the phrase Microsoft Windows NT is not a match since NT does not satisfy the restriction that the partially unspecified term be a number. Similarly, the query Agatha Christie was born in _[NUM] matches the phrase Agatha Christie was born in 1890 but does not match the phrase Agatha Christie was born in England. Note that the result presented in FIG. 9 include a score for each match. Methods for obtaining the score are discussed further below.

The invention also allows a query to contain one or more wholly unspecified terms in addition to one or more partially specified terms. For example, the query Windows_[NUM]_ contains a partially unspecified term (with an associated restriction that requires that a matching term be a number) in addition to a wholly unspecified term. FIG. 10 shows an example of results for this query. As shown in the Figure, the query matches the phrases Windows 95 drivers, Windows 2000 software, and Windows 98 information among others.

The set of terms represented by a partially unspecified term can be defined by characteristics a member must possess to satisfy the associated restriction. Examples of restrictions include categories such as proper name, location, country, date, unit of measurement, company name, etc. Thus certain restrictions are best defined by lists of terms that fall into certain categories. Certain restrictions may be expressed as a morphological criterion, as a syntactic criterion, or as a computer program. In each case, the restriction defines a requirement that must be met by a term in order to satisfy the restriction. In general, a morphological criterion defines a feature of word structure, function, or inflection. For example, a morphological restriction is used to indicate that a matching term must contain a particular unit (morpheme) such as the unit slow in the words slowly, slowest, etc. A morphological restriction may indicate a category such as a part of speech (e.g., noun, verb, preposition, adjective). Words falling within the category satisfy the restriction. For example, the three phrases Microsoft wins, Microsoft loses, and Microsoft settles are examples of matches for the partially unspecified query Microsoft_[VERB] since wins, loses, and settles each fall within the part of speech category VERB and therefore satisfy the restriction that the partially unspecified term be a verb. A morphological restriction is also used to indicate inflection, i.e., the variation in form of a single word for grammatical purposes, as with take, takes, taken, took, etc. For example, the morphological restriction [PAST TENSE] indicates that a matching term must be the past tense form of a verb.

In general, a syntactic criterion defines a feature of sentence structure such as a grammatical unit from which sentences are constructed. Examples of restrictions expressed as syntactic criteria include phrasal categories such as noun phrase, verb phrase, or prepositional phrase. FIG. 11 shows an example of results for the query Alexander Graham Bell invented _[NP]

in which [NP] is a restriction requiring that only a noun phrase can match the partially unspecified portion of the query. Thus the three strings the telephone, telephones, and many useful devices are noun phrases that match the partially unspecified term _[NP]. Note that the invention allows either a single term that occurs within a document or a group of terms that occurs within a document to match a partially unspecified term depending upon the nature of the restriction. For example, in general single terms such as through, under, etc., match a partially unspecified term with the restriction [PREPOSITION]. However, groups of terms such as through the looking glass, under the full moon, etc. match a partially unspecified term with the restriction [PREPOSITIONAL PHRASE].

In addition to categories, morphological criteria, and syntactic criteria, a restriction can also be expressed as a computer program that is invoked to determine whether a particular term or group of terms satisfies the restriction. Further details regarding this form of restriction are provided below.

It is noted that a partially unspecified query of the present invention is distinct from a query in which a term contains a wildcard character. In general, a wildcard character is a character whose purpose is to allow variations in length or spelling of a single term. In certain prior art search and query systems such wildcard characters may occur as part of a term that is otherwise fully specified. For example, the asterisk in the term col*r permits the recognition of either color or colour. Similarly, the asterisk in comput* permits recognition of computer, computers, computation, etc. Thus a wildcard character permits variation within the term that contains the wildcard character, but the variation is constrained by the defined letters in the term. A query in which a term includes a wildcard character is, in fact, fully specified with the exception that certain variations in length or spelling are permitted within an individual term including the wildcard. In contrast, in accordance with the present invention an entire term or terms can be unspecified. Thus with regard to the present invention a wholly unspecified term in a query matches any term, without requiring the presence of specific letters. In accordance with the present invention a match for a partially unspecified term is constrained by the restriction associated with the partially unspecified term rather than by a requirement for the presence of specific letters. Of course the invention also encompasses the use of wildcard characters within terms that are otherwise fully specified.

One application of the present invention lies in the task of answering a natural language question. In this application, in addition to accepting a query such as those described above, query preprocessor 32 accepts a natural language question and converts the question into a partially unspecified query. A match for the query constitutes an answer for the question.

Turning now to the operation of the invention, as shown in FIG. 5, applications stored on indexing computer 6 include indexer module 44. In certain embodiments of the invention prior to the processing of any queries an indexing phase is performed in which terms that occur within documents are stored in a data structure known as an index. For a given term, the index identifies documents that contain the term. In preferred embodiments of the invention the locations of terms within documents are also stored. In certain embodiments of the invention the number of instances of a term within a document is also stored.

In general, any collection of documents to which the invention has access can be used as a source of documents. In certain embodiments of the invention the documents are stored in document storage area 47. It is noted that the invention does not necessarily store the actual full text of the documents but may instead store a representation of the documents, e.g., using numbers to represent text. Although for purposes of description it will be assumed that in those embodiments of the invention in which matches are located within documents, the invention stores the full text, it is to be understood that this need not be the case. Furthermore, in descriptions of searching and matching provided below, the actual operations may be carried out on numerical representations of character strings rather than on the character strings themselves. In addition to storing the documents themselves, information about the documents such as the URL (for Web pages), date of creation, etc., is preferably also stored. In certain embodiments of the invention document storage area 47 resides in memory 43, although this need not be the case. Portions of document storage area 47 may be located on different storage media and devices. In certain preferred embodiments of the invention the documents are World Wide Web pages. Web documents may be identified by Web robot 46.

As used herein the word "indexing" is used broadly to refer to any of a number of processes by which information associating a term T with a body of information containing the term is stored on a computer-readable medium. For example, indexing may identify documents in which term T occurs. As described below, indexing may identify character strings or contexts in which a term T occurs. Since for purposes of the present invention a body of information containing a term is typically a body of text, these two phrases will be used interchangeably. An index comprises the terms and actual information identifying, for a term T, the bodies of text that contain T. In certain embodiments of the invention, an index also comprises a body of text that contains T.

According to one embodiment of the invention, indexer module 44 uses traditional techniques of indexing such as the one described by Salton (mentioned above) to create an index of terms, e.g., words that appear within documents. For each indexed term, the index contains an identifier for documents in which the term appears. In certain embodiments of the invention the index also includes data identifying the location(s) of a given term within the document(s) in which the term occurs. In certain situations, depending upon factors such as the size and number of the documents, the inclusion of such information greatly speeds the process of searching for matches. It is noted that the indexed terms preferably include single words and numbers and also certain groups of words or phrases. For example, proper names such as Agatha Christie and Rocky Mountains may be indexed as well as compound terms such as cocker spaniel or air base.

In preferred embodiments of the invention index 50 is stored in memory 42 of indexing computer 6 and is copied to memory 15 of query server 4 at appropriate intervals (e.g., after updating). However, the invention is not limited to storing the index there. The index can be stored in peripheral storage comprising additional hard disks or, in general, on any computer-readable medium. Furthermore, portions of the index may reside on different devices and/or media, and part or all of the index can be copied of transferred from one device to another as appropriate. Construction and manipulation of indices containing thousands of terms and referencing thousands of documents is well known to those of ordinary skill in the art.

In addition to indexing terms as described above, indexer module 44 also indexes restrictions that may be associated with partially unspecified terms in a query. In other words, for each restriction, indexer module 44 identifies documents that contain a string that satisfies the restriction. Indexing of restrictions may occur concurrently with indexing of specified terms or in a separate phase. In the former case, as indexer module 44 identifies a term to be indexed, it also determines which, if any, restrictions the term satisfies. For example, if indexer module 44 encounters the term Microsoft within a document D1, it recognizes that Microsoft satisfies the restrictions [NOUN], [NAME], and [COMPANY NAME] among others. Then, in addition to storing the information that Microsoft occurs in document D1, indexer module 44 stores the information that a string that meets the [NOUN] restriction occurs within document D1. Indexer module 44 also stores the information that a string that meets the [NAM] and [COMPANY NAME] restrictions occurs within document D1. To provide a further example, if indexer module 44 encounters the term 1890 within a document D2, it recognizes that 1890 satisfies the restrictions [NUM] and [DATE] among others. Then, in addition to storing the information that 1890 occurs in document D2, indexer module 44 stores the information that a string that satisfies the [NUM] and [DATE] restrictions occurs in document D2. Alternatively, the indexing of restrictions may take place in a separate phase to the indexing of terms. In such a case rather than first selecting a term or group of terms within a document and then determining which restrictions it satisfies, indexer module 44 first selects a restriction and then extracts from a document those terms or groups of terms that satisfy the restriction. Indexer module 44 repeats this process for each restriction. Of course indexer module may use a combination of these or other approaches or select a particular approach depending upon the situation.

The restrictions that are indexed may include any or all of those described in the section on query structure and features, including those that are satisfied by groups of terms in addition to those that are satisfied by a single term. For example, indexer module 44 identifies documents that contain terms or groups of terms that satisfy the restrictions [NP] (noun phrase), [VP] (verb phrase), [PAST TENSE], etc. In summary, indexer module 44 indexes both terms that occur within documents and also restrictions satisfied by strings within documents. In the case of a term, the index identifies documents containing the term. In the case of a restriction, the index identifies documents containing a term or group of terms that satisfies the restriction. The indexing of restrictions greatly facilitates the processing of queries that contain partially unspecified terms associated with such restrictions.

Depending on the nature of the restriction, indexer module 44 uses a variety of techniques to determine whether a string satisfies a restriction and/or to extract strings that satisfy restrictions from documents. For example, in the case of restrictions such as [COMPANY NAME], [COUNTRY], etc., it is possible to enumerate a list of terms that satisfy the restriction. In such a case indexer module 44 may simply compare a term T that occurs within a document with predefined category lists 48 that include terms that satisfy the restriction to determine whether term T satisfies the restriction. Depending upon the restriction, category lists 48 may be prepared by a human being. (Note that such lists need not necessarily be stored at the search site but may be accessed, for example, over a network.) To determine whether a term satisfies certain morphological or syntactic restrictions such as [NOUN], [VERB], [PREPOSITION], etc., indexer module 44 may refer to a stored dictionary or dictionaries 49 containing information regarding word form, part of speech, compound words and phrases, etc. Preferably category lists 48 and dictionaries 49 as are needed by indexer module 44 are stored in memory 43, at least during the indexing phase. In order to identify terms or groups of terms that satisfy more complex morphological or syntactic restrictions such as [NP], [VP], etc., indexer module 44 may use any of a variety of known techniques of text analysis. Techniques for parsing, performing morphological and syntactic analysis, etc. are described, for example, in Collins, M., Three Generative, Lexicalised Models for Statistical Parsing, Proceedings of the 35$^{th}$ Annual Meeting of the AC$_L$ (jointly with the 8$^{th}$ Conference of the EAC$_L$, Madrid, 1997; Collins, M., A New Statistical Parser Based on Bigram Lexical Dependencies. Proceedings of the 34$^{th}$ Annual Meeting of the Association for Computational Linguistics (AC$_L$), pages 184–191, 1996; Magerman, D., Statistical Decision-Tree Models for Parsing. Proceedings of the 33$^{rd}$ Annual Meeting of the AC$_L$, pp. 276–283, 1995; Woods, W. A., Transition Network Grammars for Natural Language Analysis, Communications of the ACM, Vol. 13, No. 10, October, 1970; Roche, E., Looking for Syntactic Patterns in Texts in Papers in Computational Lexicography. Complex '92, Kiefer, F., Kiss, G., and Pajzs, J. (eds.) Linguistic Institute, Hungarian Academy of Sciences, Budapest, pp. 279–287; Karp, Schabes, Zaidel, and Egedi, A Freely Available Wide Coverage Morphological Analyzer for English, Proceedings of the 15$^{th}$ International Conference on Computational Linguistics, Nantes, pp. 950–954, 1992. The contents of the preceding references are hereby incorporated by reference in their entirety. In certain instances indexer module 44 invokes a computer program to determine whether a given term satisfies the restriction. The computer program accepts the term as input and provides as output an indication of whether the term satisfies the restriction. One example is the restriction [PRIMENUM], which is satisfied by the infinite set of prime numbers. Such a set cannot be enumerated, and the most straightforward way to recognize terms that satisfy the restriction is through the use of a program that is able to determine whether a number is a prime. The following final query example illustrates the use of this restriction. The query _[NAME] was born in _[PRIMENUM]

identifies individuals who were born in a year that is a prime number. Results for this query include, among others, Charlie Chaplin was born in 1889 since Charlie Chaplin satisfies the restriction [NAME] and 1889 is a prime number. Such a query would not match Agatha Christie was born in 1890 because, although Agatha Christie is a name, 1890 is not a prime number.

During the indexing process, in addition to storing information that identifies documents containing terms that satisfy restrictions, in preferred embodiments of the invention indexer module 44 stores the location of the terms within the documents. For example, if the term 'Microsoft' appears in three locations L1, L2, and L3 within document D1, then indexer module 44 stores the fact that a term satisfying the [NOUN] restriction appears within document D1 at locations L1, L2, and L3. Indexer module 44 also stores the fact that a term satisfying the [NAME] and [COMPANY NAME] restrictions appears in D1 at L1, L2, and L3). When a restriction is satisfied by a string containing more than a single term, indexer module 44 stores both the beginning and ending locations of the string. In certain embodiments of the invention the number of instances of a term within a document is also stored.

As indexer module 44 identifies and indexes terms that appear within documents, it may also store various types of information about the terms. Such information may include the position of the term within a document, features of the format of the term within the document, etc. For example, if a term appears within a title or within a bulleted list in document D1, indexer module 44 may include such information when storing the fact that the term occurs within D1. Format features include such characteristics as font size, boldface, italics, color, etc. For example, if the term 'Microsoft' occurs within the title in boldface in document D1, embedded within the text of document D4, and in italics within document D7, an entry for the term Microsoft may appear (in schematic form) as follows:

Microsoft D1 bold, title
D4
D7 italics

As described above, indexer module 44 indexes restrictions as well as terms, i.e., indexer module identifies documents that contain terms that satisfy the indexed restrictions. As for term entries, a restriction entry may also include information regarding the position and format of term(s) that satisfy the restriction. Thus in the example of the term Microsoft described above, the entries for the restriction [COMPANY NAME] may appear (in schematic form) as follows:

Company Name D1 Microsoft bold, title
D4 Microsoft
D7 Microsoft italics

Of course similar entries also appear for the other restrictions, e.g., [NOUN], [NAME] satisfied by the term Microsoft. As mentioned previously, the restriction entries also include the locations within documents of term(s) that satisfy the restriction. It is noted that in the preferred embodiment of the invention in which the documents are Web pages, location and format features of terms within documents are typically encoded in the form of HTML tags within the documents themselves. This fact simplifies extraction of location and format features for terms.

Figure 12:
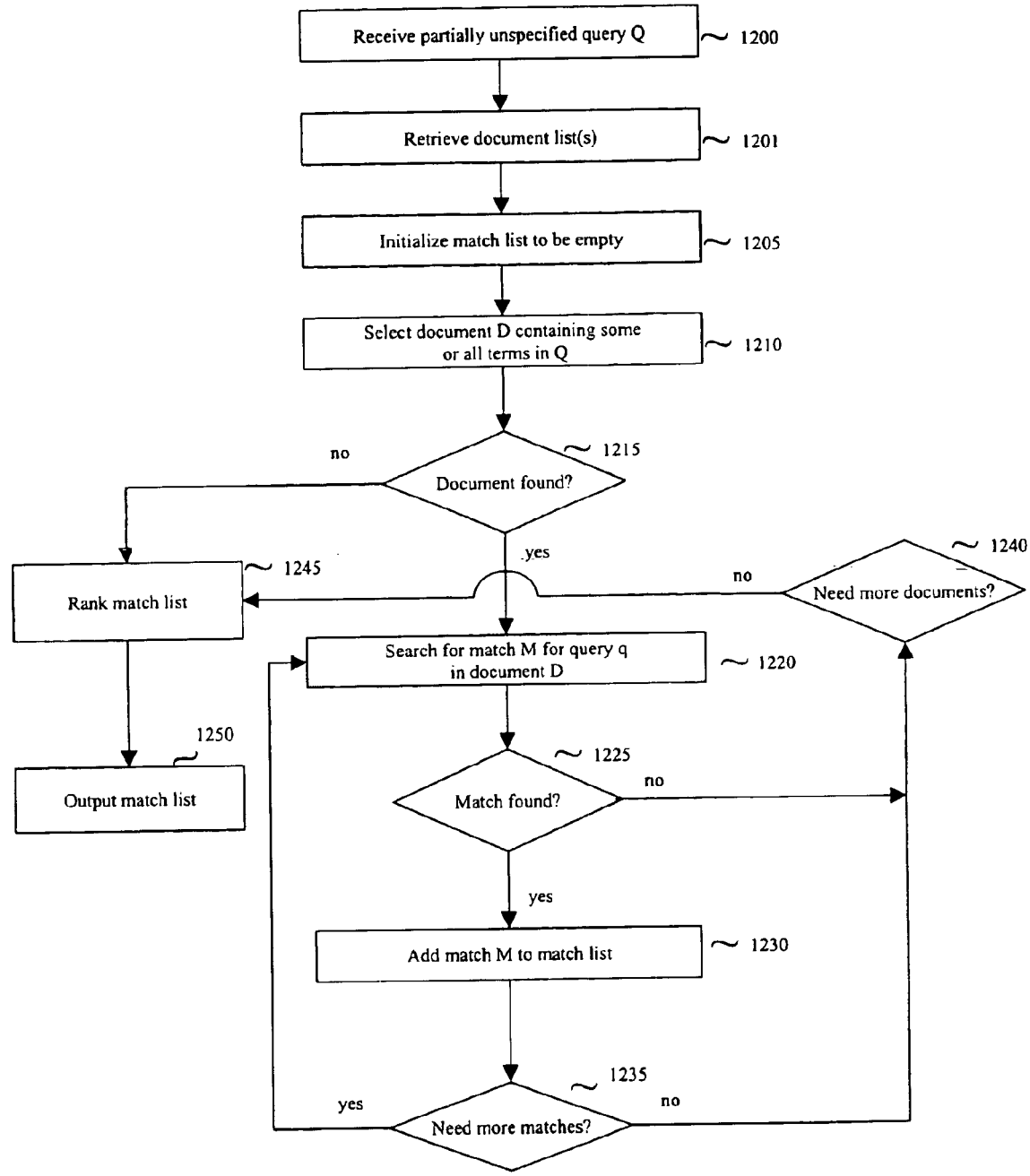
FIG. 12 is a flow diagram showing process steps for locating matches within documents and for generating and ranking a match list for a query.

FIG. 12 illustrates the operation of match engine 34 and ranking module 36 in a preferred embodiment of the invention. As described in more detail below, match engine 34 generates a list of matches (match list) for the query. In this regard, it is noted that the use of the phase "match list" to refer to the collection of identified matches (and possibly associated scores) is merely for descriptive purposes and is not intended to reflect the choice of any particular data structure. Instead, any convenient format may be used to store the identified matches, or the matches can be output as they are identified. Once the matching procedure is completed, the list of matches includes the instantiations of the partially unspecified query that match text in documents. Such a list of matches consists of sequences of words that realize the partially unspecified query, with information useful for ranking the sequences of words and/or the documents in which those sequences have been found. Referring to FIG. 12, in step 1200 match engine 34 receives a partially unspecified query Q. In step 1201 match engine 34 uses the index to retrieve, for some or preferably for each specified term, a list of documents (document list) containing the term. Also in step 1201 match engine 34 uses the index to retrieve, for some or preferably for each partially unspecified term, a list of documents (document list) containing a term or terms that satisfy the restriction associated with the partially unspecified term. For example, if the query contains two specified terms and one partially unspecified term, match engine 34 generates up to 3 document lists. In step 1205, the match list is initialized to be empty. In step 1210, match engine 34 attempts to select a document D containing some, or preferably all, of the specified or partially unspecified terms in query Q. More specifically, match engine 34 intersects some or all of the document lists in order to identify documents that contain some or all of the terms in query Q. Preferably the match engine intersects those document lists containing the fewest documents. Since document lists for specified terms frequently contain fewer documents than document lists for partially unspecified terms, in a preferred embodiment of the invention the document lists for some or all specified terms in Q are intersected in step 1210. At decision step 1215, match engine 34 determines whether a document has been found. If so, it proceeds to step 1220. In step 1220, match engine 34 searches for a match M for query Q within document D. Methods for locating a match are discussed in more detail below. At decision step 1225, match engine 34 determines whether a match has been located. If not (e.g., if all matches for query Q within document D have been located), processing proceeds to step 1240, which is discussed below. If, on the other hand, a match M has been located then in step 1230 match engine 34 accumulates information about match M and adds match M to the match list. Step 1230 is discussed in more detail below. At this point it is noted that in addition to storing the matches, match engine 34 stores a score for each match, preferably as part of the match list.

At decision step 1235, match engine 34 determines whether more matches are needed. A variety of criteria may be employed to make this determination. Match engine 34 may consider the set of matches already located within document D to determine whether more matches from document D are needed. For example, if match engine 34 has already located a particular match multiple times within document D (and especially if match engine 34 has not located any other distinct matches within document D), it may not be worthwhile to continue searching for matches within D. In such a case match engine 34 may determine at step 1235 that no more matches from document D are needed. Match engine 34 may also use information regarding the matches located thus far across a plurality of documents. For example, the total number of matches or the total number of different matches found thus far may be compared with a predetermined number or with a number selected by a user or may base the determination on the length of time already spent finding matches. Of course match engine 34 may use a combination of these or other methods to determine whether more matches are needed. If match engine 34 determines that more matches are needed, processing returns to step 1220. Once all matches for the query within document D have been located or match engine 34 determines that no more matches are needed, processing progresses to decision step 1240.

At step 1240, match engine 34 determines whether more documents need to be searched. As when deciding whether more matches are needed, a variety of criteria may be employed to determine whether more documents are needed. The determination may be based in part or entirely on the contents of the match list assembled thus far. For example, if the match list already contains a predetermined number of matches, match engine 34 may determine that no more documents need to be examined. Match engine 34 may also use information regarding the documents already searched for matches or the time spent searching. For example, it may be desirable to search a predetermined number of documents regardless of how many matches are already stored in the match list. If more documents are needed, processing returns to step 1210, where another document containing potential matches for query Q is selected as described above. Steps 1215 through 1240 are repeated until either no more documents containing potential matches are found or until no more documents are needed. In either case, match engine 34 proceeds to step 1245. In step 1245, ranking module 36 ranks the assembled match list. As described above, in preferred embodiments of the invention the match list includes a score for each match. In such a case, ranking module 36 may simply rank the matches based on the score. In other instances ranking module 36 may take additional information into account in assigning a ranking to the matches in the match list. If redundant matches have not been eliminated at an earlier step, this task may be performed in step 1245. Preferably the matches are also placed in an order based on the ranking although ordering may be performed instead by results page generator 38. Following step 1245, in step 1250 match engine 34 outputs the match list. The output can be provided to results page generator 38, to another computer program, etc. It is noted that ranking is included in preferred embodiments of the invention, but it is not a requirement that the matches are ranked. Therefore ranking step 1245 is optional.

Methods for executing step 1220, i.e., locating a match for a partially unspecified query Q within a document D will now be discussed in greater detail. Such methods may vary depending upon the nature of the query. In the case of a query Q containing only a specified portion and a wholly unspecified portion, step 1220 may first select part or all of the specified portion of Q (i.e., one or more specified terms). Step 1220 locates an instance of the selected portion within document D using conventional techniques, e.g. by performing a full text search, or using location information from the index. The text including and adjacent to the located portion contains potential matches for Q. Step 1220 then explores the text on either or both sides of the located portion, searching for a character string (including the located portion) that meets the following criteria:

(1) For each of the specified terms in query Q, an equivalent (matching) term is located at the corresponding position in the character string.
(2) For each of the wholly unspecified terms in query Q, a term (any term) is located at the corresponding position in the string.

A character string that meets these criteria is identified as a match for query Q.

If query Q contains a partially unspecified portion, step 1220 may first select part or all of the partially unspecified portion or part or all of the specified portion of Q (if Q contains such a portion). As mentioned above, in the case of a query containing a partially unspecified term, the index preferably includes the beginning and ending locations of strings that satisfy the restriction associated with the term. Thus in preferred embodiments of the invention step 1220 first selects a partially unspecified term in Q. When Q consists of a single partially unspecified term, matches for Q can be found using the index without necessarily searching within document D. When Q contains additional specified or partially unspecified terms, step 1220 preferably uses the index to locate a character string within document D that satisfies the restriction associated with the term. The text including and adjacent to the located character string contains potential matches for Q. Step 1220 explores the text on either or both sides of the located string, searching for a character string (including the located string) that meets the following criteria:

(1) For each of the specified terms in the query an equivalent (matching) term is located at the corresponding position in the string.
(2) For each of the wholly unspecified terms in the query a term (any term) is located at the corresponding position in the string.
(3) For each of the partially unspecified terms in the query a term or a group of terms that satisfies the restriction associated with the partially unspecified term is located at the corresponding position in the string.

A character string that meets these criteria is identified as a match for the partially unspecified query Q. If Q contains more than one partially unspecified term, step 1220 may use the index to determine whether strings that satisfy the restrictions associated with the partially unspecified terms occur in D in the appropriate positions with respect to one another in order to match query Q. Various techniques for performing string matching, pattern matching, etc. known in the art may be employed in step 1220. Such techniques are described, for example, in Cormen, T., Leisersen, C., Rivest, R., Introduction to Algorithms, Ch.34, The MIT Press, 1989, the contents of which are hereby incorporated by reference. It is noted that the matching process can be implemented in a number of different ways, and variations on the matching technique as described herein are within the scope of the invention. Furthermore, the above discussion has not addressed the handling of details such as punctuation, hyphens, spaces between terms, etc. Handling of these details will vary with any particular implementation of the inventive system according to the preferences of one of ordinary skill in the art who will practice the invention. All such variations are within the scope of the invention.

The process of adding a match to the match list (step 1230) will now be discussed in greater detail. As mentioned above, in preferred embodiments of the invention, the match list includes a score for each of the matches listed therein. In one embodiment of the invention step 1230 may simply add each newly located match to the match list, regardless of whether the identical match has been previously located and already appears in the match list, i.e., whether the newly identified match represents a distinct match that has not been previously identified or represents an instance of a match that has been previously identified. In such a case the score for the match may reflect factors such as the position and/or format of the match within a document. However, in preferred embodiments of the invention in step 1230 match engine 34 determines whether a newly located match already appears in the match list and, if so, does not add another copy of the match to the match list. Instead, match engine 34 updates the score for the match to reflect the fact that the match has been located again. In such a case the score for a match reflects the number of times an instance of the match is located across a plurality of documents. Of course the score for the match may also reflect factors such as the position and/or format of the match within a document (e.g., whether the match appears in a title, in bold face, etc.). Features of the document in which a match is found such as the age or source of the document can also be used in assigning a score to the match. These factors may also be used in ranking the documents in which instances of a particular match are located, and in some embodiments of the invention match engine 34 maintains a document score for documents in which a match is identified.

Additional criteria may be used to determine the score for a match. In particular, in assigning a score match engine 34 may perform a normalization process based on the occurrence of particular words in the match across a plurality of documents in the database. The normalization process considers the frequency with which a portion of a match that matches the unspecified portion of the query occurs across a plurality of documents. If the portion of the match that matches the unspecified portion of the query occurs commonly, then it is relatively less likely that the match contains specific information relevant to the query. To provide an example, consider the query
_Windows
Phrases such as Microsoft Windows that include specific information related to Windows may appear very frequently within certain documents. However, in a large body of text with diverse content such as the set of Web pages, it is likely that phrases such as the windows, some windows, many windows, etc., will be more common. Since matches that contain common but information poor words such as the, some, etc. are relatively unlikely to contain desired information, the score for such matches should be low relative to the score for matches that do not contain such words. Normalization helps to ensure that this is the case. In a preferred embodiment of the invention match engine 34 normalizes the score by dividing it by a weighting factor that reflects the number of occurrences of the portion of the match that corresponds to the unspecified portion of the query among a plurality of documents. This information is available in the index of terms. For example, in the matches Microsoft Windows, the windows, and some windows, the words Microsoft, the, and some correspond to the unspecified portion of the query _Windows. During normalization, match engine 34 determines that Microsoft appears much less frequently among all the indexed documents than the common words the and some. Thus the weighting factor for Microsoft is much lower than the weighting factor for the other terms. Therefore, after dividing by the weighting factor the final score for Microsoft Windows will be greater than the score for the matches containing the common words. Different methods of performing normalization based on the occurrence of terms within the documents are also within the scope of the invention. Additional criteria such as the presence of certain terms whose co-occurrence is of particular significance can also be used to modify the score for a match.

Match engine 34 preferably keeps track of the number of instances of each distinct match within each document. Such information is stored and is used, for example, to rank the documents that contain the match as described in more detail below. This information can also be used in assigning a score to a match. For example, in certain embodiments of the invention one factor that is taken into consideration in assigning a score to a match is the relative distribution of instances of the match among documents. In particular, if instances of a match appear a large number of times within one or a few documents, the match may be less significant than if instances of the match appear within a large number of documents, even if the number of instances of the match within each of these documents is relatively small. For example, if a match appears 100,000 times within a single document, the match may be less significant than if the same match appears 5 times within 20,000 individual documents. Thus information accumulated about a match, such as the number of instances of the match within a document, may be used to assign or modify a score associated with the match in order to take such factors into account.

Of course, the score can also reflect factors such as the position and/or format of the match within a document or other information accumulated about the match. For example, when another instance of a match that already appears within the match list is located, the score for the match may be incremented by a certain amount A. If the newly located instance of the match occurs in boldface, the score may be incremented by an amount A+B. The score can also reflect features associated with the document in which a match appears. For example, the score may reflect such factors as the age of the document or the document's source. During the process of match acquisition, the match list may be maintained in an order based, for example, on the content of the matches or on their scores.

As described above, a match list entry for a query Q includes an entire string that matches Q along with an associated score for the match. However, in certain embodiments of the invention only that portion of a match that corresponds to the unspecified portion of the query is stored. In other words, match engine 34 extracts from a located match M that portion that corresponds to the unspecified portion and stores only that portion in the match list rather than storing the entire matching string. In this case for a query such as _[CITY] is especially famous for its Gothic cathedral the match list consists of those portions of the matching strings that satisfy the restriction [CITY], e.g., Chartres, Ulm, Cologne, Durham. Of course in preferred embodiments of the invention the match list also includes a score for each match reflecting the number of times the match is identified among a plurality of documents. Thus a match list for the query may appear as follows in schematic form:

{(Chartres, 125) (Ulm, 100) (Cologne, 75) (Durham 50)}

In addition, in the case of a query that contains multiple wholly or partially unspecified terms, it is possible that only a portion of a located match corresponding to one or more of the terms is of interest. For example, matches for the query _[NAME] won_[NP] in the 1976 Olympics might include Nadia Comaneci won several gold medals in the 1976 Olympics; Danielle Debernard won a bronze medal in women's alpine skiing in the 1976 Olympics; John Naber won five medals in swimming in the 1976 Olympics, etc. However, a user may be interested only in the names of athletes who won medals medal in the 1976 Olympics, rather than in the specific details. In such a case the portion of the query of interest indicated by _[NAME] can be designated so that only the portion of a match that satisfies the restriction is added to the match list. Thus matches for the above query, assuming _[NAME] is the designated portion, would include Nadia Comaneci, Danielle Debernard, and John Naber among others. Note that the breadth of the restriction _[NP] allows the capture of a wide variety of matches since the phrases several gold medals, a bronze medal in women's alpine skiing, and five medals in swimming all satisfy the restriction [NP]. This breadth maximizes the use of available information. By permitting designation of only a portion of the query, the user's specific information need (the names of medal winners) can be optimally satisfied without providing additional, possibly unwanted, details. The portion of a query that is of particular interest can be designated in any of a number of ways. For example, a character such as a question mark can be used instead of an underscore character to designate wholly or partially unspecified terms of particular interest.

Use of Contexts

In certain preferred embodiments of the present invention, a somewhat different approach to identifying matches for queries is taken as compared with that described above. In particular, these embodiments use a context index generated by context indexer module 45. In addition to storing a term T, as is done in conventional indexing, context indexer module 45 also stores the surrounding terms, e.g., a character string in which the term appears. The surrounding terms define a context for term T. Matches for a query are identified by searching the stored contexts rather than by searching within documents. This indexing strategy allows for faster and more efficient processing of partially undefined queries, as it eliminates the need to access and examine the document. Contexts for both specified and partially unspecified terms are stored in preferred embodiments of the invention. Note that in those embodiments of the invention that use a context index, the conventional index described above remains available. Thus information such as the list of documents that contain a particular term T can be extracted from the conventional index in those embodiments of the invention that employ a context index for locating matches.

The context of a term may be defined in a number of ways. For example, a context for a term T may consist simply of a predetermined number of preceding and following neighboring terms including T, as a line of text containing T, or as a sentence or sentences containing T. For example, a context may consist of a term and between 1 and 15 terms on each side of the term. Preferably a context consists of a term and between 4 and 8 terms on either side of the term. Other ways of defining a context for a term T are also within the scope of the invention.

In certain embodiments of the invention, a context C for a term T is actually stored as two contexts, namely a left context $C_L$ and a right context $C_R$. A left context is a group of consecutive terms, beginning with the first term to the left of T and optionally extending in a leftward direction to include additional terms. Similarly, a right context is a group of consecutive terms, beginning with the first term to the right of T and optionally extending in a rightward direction to include additional terms. Preferably a left or right context extends to include multiple additional terms. Note that a left or right context for a term T need not include the term T itself For example, the string Alexander Bell invented the telephone serves as a context for the term invented (among others). The string Alexander Bell serves as a left context for the term invented, and the string the telephone serves as a right context for the term invented. Of course in the case of a body of text containing the string Alexander Bell invented the telephone, the left and right contexts can extend further, to include additional terms. In a case that left and right contexts are stored, information identifying the left and right contexts as such is preferably also stored. Such information can be stored within the context data structure. Storing left and right contexts for a term can reduce the amount of searching required to identify matches for queries including the term, as described further below.

The contexts can be stored as strings of text. Alternatively, the contexts can be represented and stored as graphs, trees, or in any of a variety of data structures. In certain preferred embodiments of FSAs. To this end, context indexer module 46 includes automaton generation module 52, which converts the contexts into finite state automata and stores the contexts in this form as discussed in further detail below.

Figure 13:
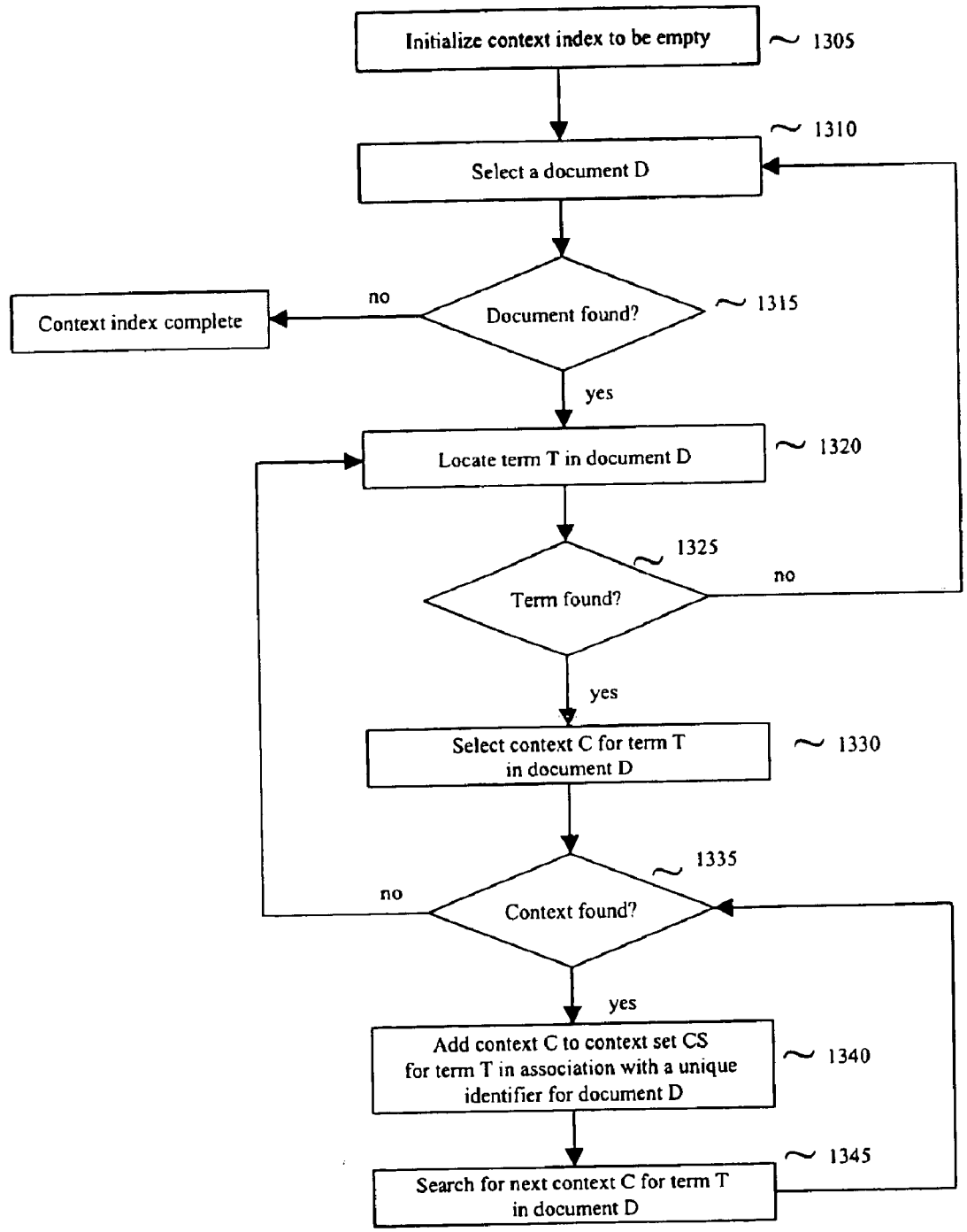
FIG. 13 is a flow diagram showing process steps for preparing a context index.

FIG. 13 illustrates the preparation of an index that stores contexts. In step 1305, the context index is initialized to be empty. In step 1310, context indexer module 46 selects a new document (i.e., a document that has not yet been processed) from a database. At decision step 1315, if a new document D has been found context indexer 38 proceeds to step 1320, in which a new term T in document D (i.e., a term for which a context set from document D has not yet been obtained) is selected. At decision point 1325, if a new term T has been found context indexer module 45 proceeds to step 1330. In step 1330 context indexer module 45 searches for a context C for term T. If a context for T is found, context indexer module 45 proceeds through decision step 1335 to step 1340, in which context C is added to the set of contexts CS for term T in association with a unique identifier for document D. At this step information about the context such as its position within a document may also be stored. Step 1340 is discussed in more detail below. In step 1345, context indexer module 45 searches for the next context C for term T within document D. Steps 1335 through 1345 are repeated sequentially until no more contexts for T within D can be found. Processing then returns to step 1320, in which a next term T is selected. Steps 1325 through 1345 are repeated until a new term can no longer be found within document D. Processing then returns from decision step 1325 to step 1310, in which a new document is selected. Steps 1310 through 1345 are repeated until no new documents can be found, at which point the context index is complete and processing stops.

Although as described above a context set is generated for every term within document D, in certain embodiments of the invention context indexer module 45 does not obtain a context set for certain terms, e.g., common words or words that have a low information content such as a, the, it, etc. Such words can be screened out at steps 1320.

Note that in addition to storing contexts for specified terms, context indexer module 45 may store contexts that satisfy restrictions. For example, a string such as Alexander Bell invented the telephone in 1876 can serve as a context for the specified term telephone. Since the telephone is a noun phrase, Alexander Bell invented the telephone in 1876 is also a context that satisfies the restriction [NP]. Of course, the string is also a context for the restrictions [PROPER NAME], [VERB], [DETERMINER], among others, since it contains terms or groups of terms that satisfy these restrictions. It is noted that in certain embodiments of the invention the context set CS for a term T actually consists of multiple subsets of contexts, each subset consisting of contexts found within a single document. These subsets are distinguishable by virtue of the unique document identifier associated with each subset. Such a context set will be referred to as a type I context set. In other embodiments of the invention, however, the contexts are stored without a document identifier. In such a case a single context set exists for each term. Such a context set will be referred to as a type II context set. The data structures in which the context sets are stored are described in further detail below.

Turning in more detail now to step 1340, it is noted that although the contexts can be stored as simple character strings, in preferred embodiments of the invention they are stored as FSAs. In this regard, the concept of using finite state automata to represent natural language is well known in the art and is discussed, for example, in Roche, Emmanuel and Schabes, Yves (eds.), Finite State Language Processing, Ch. 1 (pp. 1–66) and 11 (pp. 329–354), MIT Press, Cambridge, Mass., 1997, the contents of which are herein incorporated by reference. Briefly, a finite state automaton (FSA) is a structure having a finite number of states including an initial state and at least one final state (also referred to as an accept state). The states are connected by a plurality of arcs. The arcs have an input, which defines a requirement that must be met in order to traverse the arc, i.e., to proceed from one state to another. The automaton is driven from state to state by a sequence of inputs. If the automaton is in a final state (accept state) after processing the elements in the input string, then the FSA has accepted the input.

Figure 14:
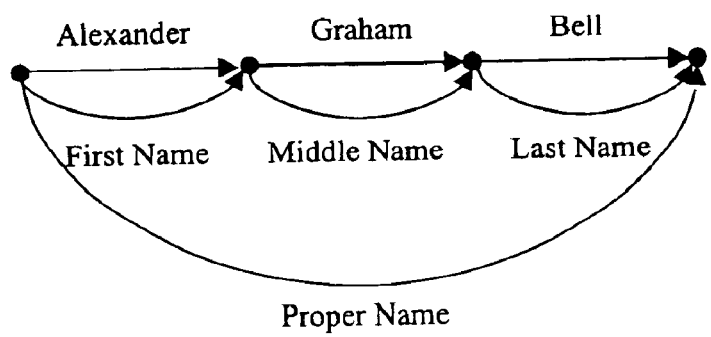
FIG. 14 shows an example of an FSA that represents the proper name Alexander Graham Bell.
Figure 15:
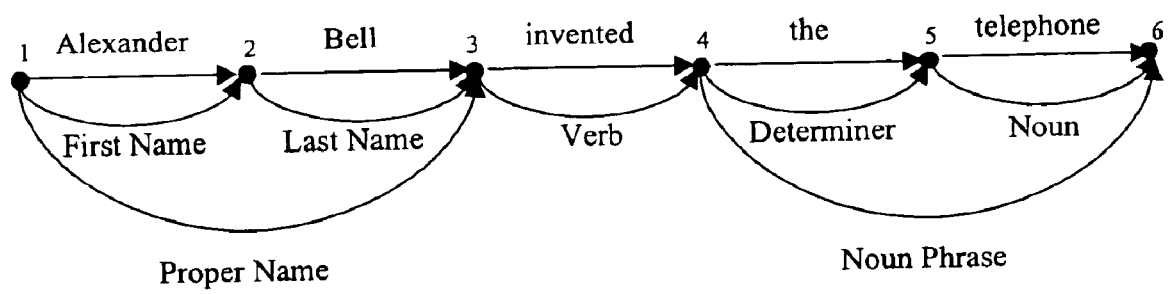
FIG. 15 shows an example of an FSA that represents the phrase Alexander Bell invented the telephone.

FIG. 14 shows an example of an FSA that represents a context for the string Alexander Graham Bell. Referring to that Figure, it is noted that the FSA includes the terms Alexander, Graham, and Bell. In addition, the FSA includes information about the restrictions that are satisfied by these terms. For example, the FSA contains the information that Alexander Graham Bell is a proper name. The FSA further contains the information that in this case Alexander is a first name, Graham is a middle name, and Bell is a last name. Assuming that the leftmost state is an initial state and the rightmost state is a final state, this FSA accepts the input string Alexander Graham Bell. Depending upon which states are considered as initial and final states, the FSA may accept other inputs. Similarly, FIG. 15 shows an FSA that represents a context for the term telephone. The labels on the arcs of the FSA represent information about the restrictions that are satisfied by various portions of this context. For example, by examining the FSA it can be determined that invented satisfies the restriction [VERB] and that the string the telephone satisfies the restriction [NP] (noun phrase). In this manner, any of the restrictions used in partially unspecified queries, including morphological and syntactic restrictions as well as computer programs, can be expressed in the form of arcs within an FSA. Storing the contexts as FSAs facilitates the rapid and efficient processing of queries containing partially unspecified terms. In particular, the matching process is streamlined since the FSA contains all information needed to determine whether terms in the context satisfy restrictions associated with partially unspecified terms in the query.

Figure 16:
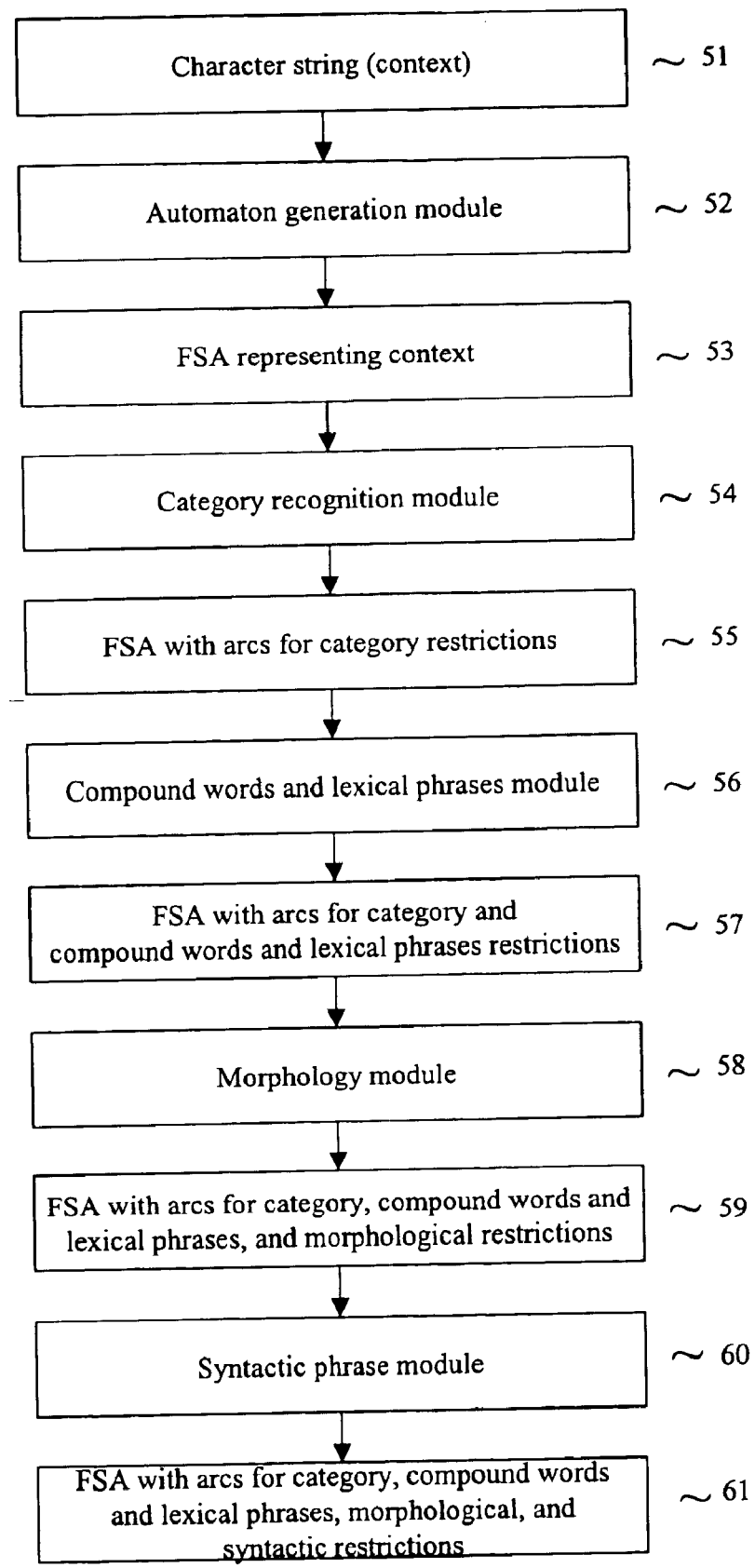
FIG. 16 shows process steps to generate an FSA to represent a context.

FIG. 16 shows the execution of step 1340 in a case that the contexts are stored as FSAs. Context indexer module 45 passes a character string 51 consisting of an identified context to automaton generation module 52, which is comprised of computer-executable process steps to generate an FSA from an input character string. The context is provided to automaton generation module 52, which produces an FSA 53 that represents the character string. In this regard it is noted that converting the character string into an FSA involves first parsing the string to identify individual terms. The FSA generated by automaton generator 52 includes a plurality of states connected by arcs, with one arc corresponding to each term in the input text. The states and arcs are arranged such that the arc that connects the first two states corresponds to the first term in the character string, and arcs connecting successive states correspond to successive terms in the character string.

Once automaton generation module 52 has constructed an FSA for a context, information indicating which portions of the context satisfy the various restrictions (categories, morphological, syntactic, etc.) discussed above is incorporated. This task is performed by category recognition module 54, compound words and lexical phrases module 56, morphology module 58, and syntactic phrase module 60. After automaton generation module 52 has created FSA 53 for the terms in a context, FSA 53 is provided to category recognition module 54. Category recognition module 54 identifies terms that satisfy various restrictions that are defined as categories (e.g., COUNTRY, CITY, COMPANY NAME) and adds a new arc labeled with the restriction for each term or group of terms that satisfies the restriction. Category recognition module 54 uses stored category lists 28 described above for this purpose. FSA 55, generated by category recognition module 54, is provided to compound words and lexical phrases module 56, which identifies compound words such as air base and lexical phrases such as according to, once in a blue moon, etc. Such compound words or phrases, although comprised of multiple terms, typically behave as a single part of speech and therefore satisfy restrictions such as [NOUN], [PREPOSITION], etc. Compound words and lexical phrases module 56 adds a new arc labeled with the appropriate restriction for each group of terms that satisfies the restriction. The arc begins at the state from which the arc corresponding to the first term in the group originates. The arc terminates at the state at which the arc corresponding to the last term in the group terminates. Compound words and lexical phrases module 56 preferably uses a stored dictionary 29 containing such words and phrases along with their associated part of speech. An example of such a dictionary is provided as Appendix C in applicants' co-pending application (Ser. No. 09/084,535, filed May 26, 1998) entitled "Spelling and Grammar Checking System". The contents of this application are incorporated herein by reference in their entirety. FSA 57, generated by compound words and lexical phrases module 56 is input to morphology module 58, which adds morphological analyses of each term to the FSA based on entries in a stored morphological dictionary 29. Such analyses preferably include, as a minimum, a part of speech for each term. Thus morphology module 58 adds an arc labeled with the appropriate part of speech for each term. In addition, the analyses may include an indication of the tense and/or the base form of a term. Morphology module 58 adds appropriate arcs to the FSA to represent each of these items. FSA 59, generated by morphology module 58, is then input to syntactic phrase module 60, which identifies phrases such as noun phrases, verb phrases, etc. that occur within the context and adds an appropriate arc for each phrase to the FSA. As described for arcs added by compound words and lexical phrases module 56, the arc begins at the state from which the arc corresponding to the first term in the group originates and terminates at the state at which the arc corresponding to the last term in the group terminates. FSA 61, generated by syntactic phrase module 60, includes arcs for category restrictions, compound words and lexical phrases, morphological restrictions, and syntactic restrictions satisfied by a term or group of terms in the context.

In summary, in embodiments of the invention in which a context is stored as an FSA, step 1340 preferably comprises the construction of the FSA by automaton generation module 52, category recognition module 54, compound words and lexical phrases module 56, morphology module 58, and syntactic phrase module 60. It is noted that the foregoing description is provided by way of illustration and is not intended to be limiting. Numerous variations on the foregoing are within the scope of the invention. For example, rather than generating new FSAs incorporating arcs for the various restrictions, modules 54, 56, 58, and 60 may instead modify the FSA generated by automaton generation module 52 to include the additional arcs. In addition, category recognition module 54, compound words and lexical phrases module 56, morphology module 58, and syntactic phrase module 60 can operate in any order, and any or all of the modules can be omitted entirely. As mentioned above, context indexer module 46 may store information about the context that may be used in assigning a score to a match that is located within the context. Such information may include features such as the position of the context within a document. In embodiments of the invention in which the contexts are represented as FSAs, such information is assigned to the FSA.

Data Structures for Context Set Indices

Figure 17:
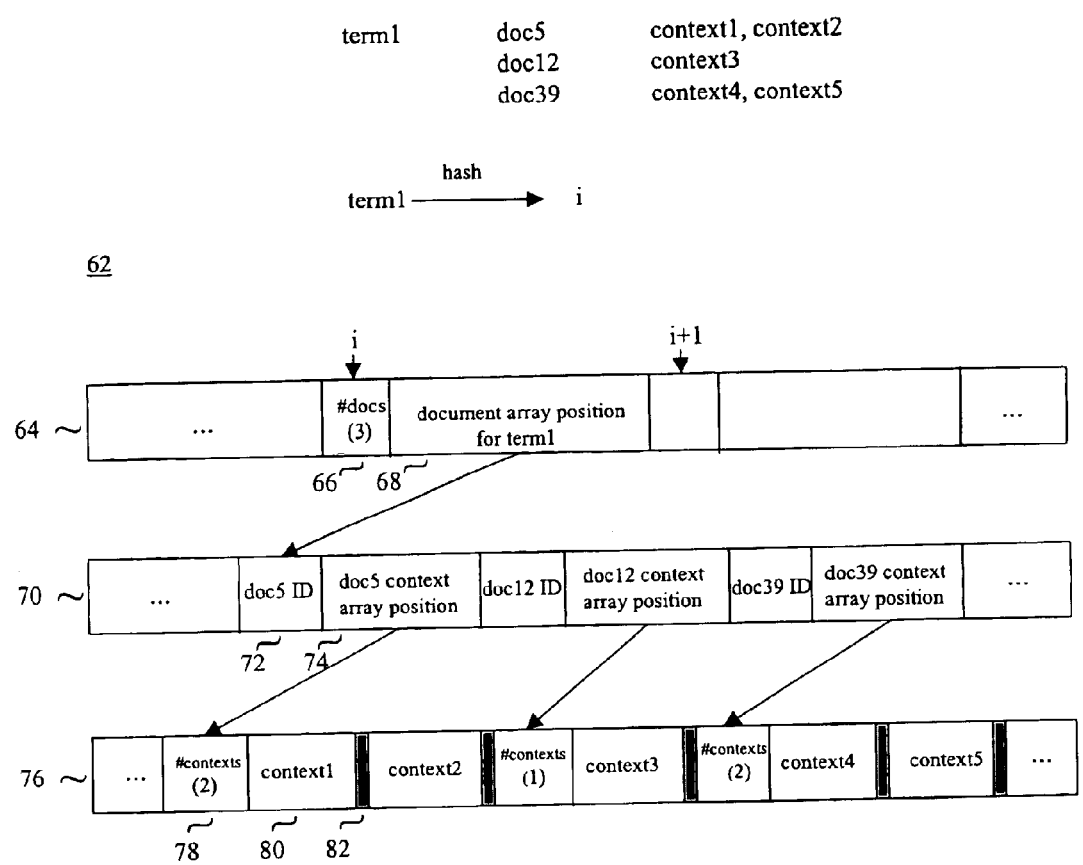
FIG. 17 is a diagram of a data structure for storing a set of contexts for terms that occur in documents, organized by document (type I context set).
Figure 18:
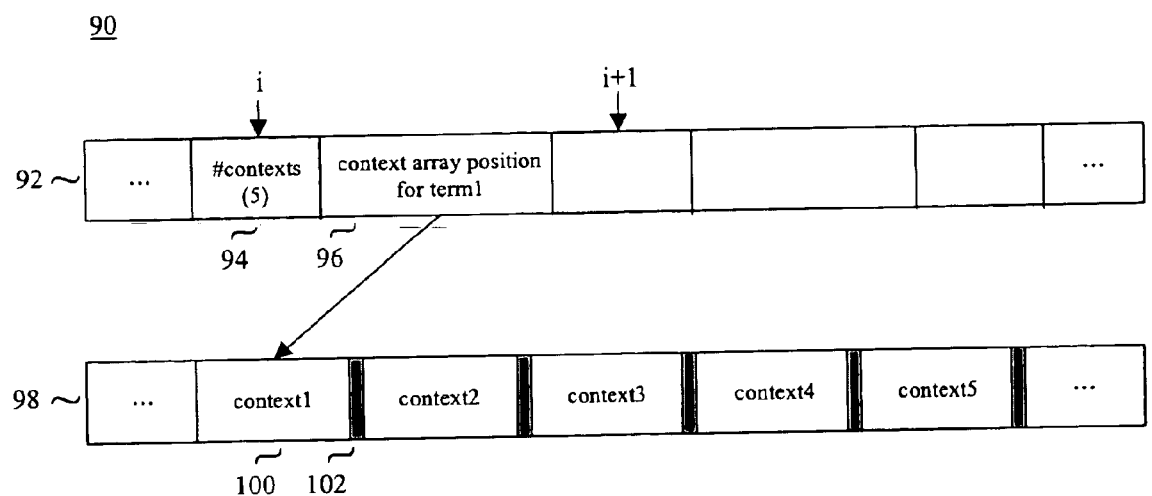
FIG. 18 is a diagram of a data structure for storing a set of contexts for terms (type II context set).

As mentioned above, in those embodiments of the invention that do not use contexts, the index is based upon traditional indexing techniques. The use of a context-based index requires different data structures. FIGS. 17 and 18 show preferred embodiments of data structures in which to store an index that identifies contexts in which a term appears. In a preferred embodiment of the invention, before storing information in the context index, a term T is transformed into a unique numerical identifier i through the use of the hashing technique. As described below, information relevant to term T is stored at location i in an array in the context index. Thus when a term T is being processed, the location of indexed information for that term can be readily determined by obtaining the hashed value for T. In this regard it is noted that hashing techniques and algorithms have long been known in the art. Such techniques and algorithms are discussed, for example in Frakes, W. and Baeza-Yates, R. (eds.) *Information Retrieval: Data Structures and Algorithms*, Ch. 13, Prentice-Hall, Inc., Upper Saddle River, 1992 and in Cormen, T., Leiserson, C., and Rivest, R., *Introduction to Algorithms*, Ch. 12, The MIT Press, Cambridge, 1989. The contents of the preceding two books are incorporated herein by reference. FIG. 17 shows a data structure 62 to store a type I context set. For illustrative purposes it is assumed that the data structure contains an entry for a term T and that term T occurs in two contexts (context1 and context2) within document doc5, in one context (context3) within document doc12, and in two contexts (context4 and context5) within document doc39. Data structure 60 consists of a term array 64, a document array 70, and a context array 76. For any term T, term array 64 contains the following two items: (1) a document count 66, i.e., the number of documents in which the term occurs among all indexed documents; (2) a document array position 68 that identifies the section of document array 70 that contains information relevant to term T. In preferred embodiments of the invention the value i, obtained by applying a hashing function to term T, identifies the location of the entry for term T within term array 64. For each document D in which term T occurs, the document array entry storing information relevant to term T contains the following two items: (1) a document identifier 72; (2) a context array position 74 that identifies the section of the context array that contains information relevant to both term T and document D. Note that in certain instances the context array position can be empty. For example, in the case of common words such as the, the system may opt not to store a context set. Turning now to context array 76, for each document D in which term T occurs, context array 76 contains a context count 78 identifying the number of contexts in which term T occurs in D, followed by the contexts themselves, 80. Individual contexts are separated by end-of-context markers 82. Note that the context array groups the set of contexts for a term T on a document by document basis, i.e., as a set of context subsets. Thus it is straightforward to search all the contexts for a term T that occur in a first document D before moving on to contexts for T that occur in a second document. Furthermore, the information about which document contains the context is retained.

FIG. 18 shows a data structure 90 to store a type 11 context set. For illustrative purposes it is assumed that the data structure contains an entry for a term T and that term T occurs in a total of three contexts within documents in a database. Data structure 90 consists of a term array 92 and a context array 98. For any term T, the term array contains the following two items: (1) a context count 94 identifying the number of contexts in which the term occurs among all indexed documents; (2) a context array position 96 that identifies the section of the context array that contains contexts for term T. In preferred embodiments of the invention the value i, obtained by applying a hashing function to term T, identifies the location of the entry for term T within term array 92. Note that as described for the type I context data structure, in certain instances the context array position can be empty. For each term T, the context array 98 contains the contexts 100 in which T occurs, separated by end-of-context markers 102. Note that information about which document contains a given context is not retained.

The foregoing has described particular data structures of use for storing contexts. Of course many variations on such structures will occur to those of skill in the art, and such alternative structures are within the scope of the invention.

Identifying Matches in Context Sets

Figure 19:
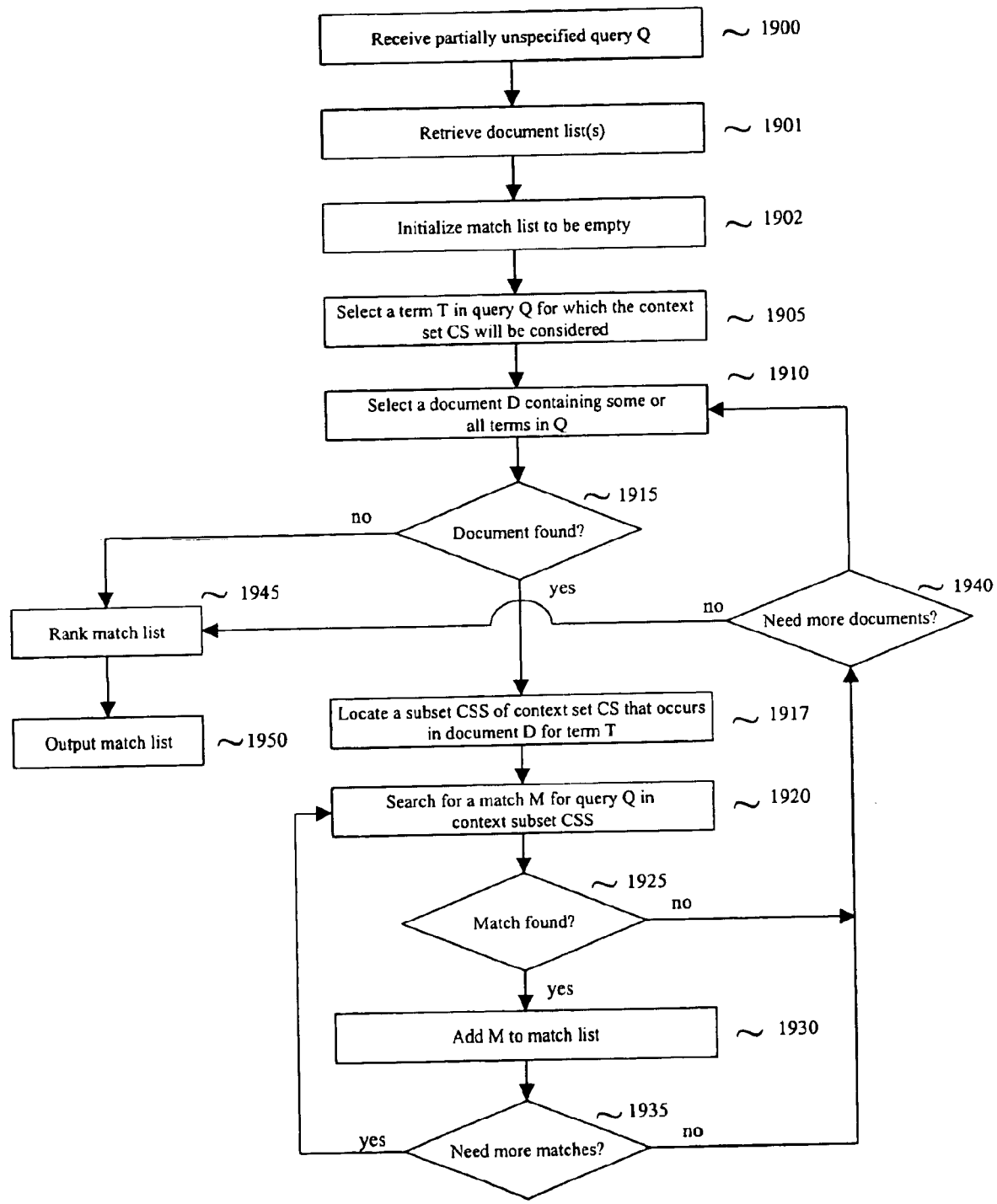
FIG. 19 is a flow diagram showing process steps for locating matches for a partially unspecified query within a set of contexts organized by document and for generating and ranking a match list for the query.

FIG. 19 illustrates the operation of match engine X and ranking module X in a case in which the index stores type I context sets for terms. Referring to FIG. 19, in step 1900 match engine 34 receives a query Q. In certain embodiments of the invention the query is partially unspecified, but this need not be the case. In step 1901 match engine 34 retrieves, for some or preferably for each specified term, a list of documents (document list) containing the term. Also in step 1901 match engine 34 retrieves, for some or preferably for each partially unspecified term, a list of documents (document list) containing a term or terms that satisfy the restriction associated with the partially unspecified term. For example, if the query contains two specified terms and one partially unspecified term, match engine 34 generates up to 3 document lists. In step 1902, the match list is initialized to be empty. In step 1905, match engine 34 selects a term T in query Q for which the context set CS will be considered. In step 1910, match engine 34 attempts to select a document D containing some or all of the terms in query Q. More specifically, match engine 34 intersects some or all of the document lists provided by in order to identify documents that contain some or all of the terms in query Q. Preferably the match engine intersects those document lists containing the fewest documents. Since document lists for specified terms frequently contain fewer documents than document lists for partially unspecified terms, in a preferred embodiment of the invention the document lists for some or all specified terms in Q are intersected in step 1910. At decision step 1915, match engine 34 determines whether a document has been found. If so, it proceeds to step 1917, in which it locates the subset CSS of the context set for term T that occurs within document D. (As mentioned above, a type I context set contains multiple subsets of contexts, each subset including contexts that occur within a single document.) Proceeding to step 1920, match engine 34 searches for a match M for query Q within the context subset CSS. This step is discussed in further detail below. At decision point 1925, if a match M has been found, processing proceeds to step 1930. In step 1930 match engine 34 accumulates information about match M and adds match M to the match list. As described above, in addition to storing the matches, match engine 34 stores a score for each match, preferably as part of the match list. At decision point 1935, in the case that match engine 34 determines that more matches are needed, processing returns to step 1920. Once all matches for the query within context subset CSS have been located (i.e., if step 1920 fails to locate a match) or match engine 34 determines that no more matches are needed, processing progresses to decision step 1940.

At step 1940, match engine 34 determines whether more documents need to be searched. In the case that more documents are needed, processing returns to step 1910, where another document containing some or all of the specified terms in query Q (if available) is selected as described above. Steps 1910 through 1940 are repeated until either no more documents containing some or all of the specified terms in query Q can be found or until no more documents are needed. In either case, match engine 34 proceeds to step 1945. In step 1945 ranking module 36 ranks the assembled match list. Following step 1945, in step 1950 match engine 34 outputs the match list. The output can be provided to results page generator 38, to another computer program, etc. It is noted that ranking is included in preferred embodiments of the invention, but it is not a requirement that the matches are ranked. Therefore ranking step 1945 is optional. It will be noted that steps 1930, 1935, 1940, and 1945 performed by match engine 34 and ranking module 36 in embodiments of the invention that locate matches within context sets have direct counterparts in steps 1230, 1235, 1240, and 1245 performed by those embodiments described earlier that do not use contexts. Therefore, for the sake of brevity, steps 1930, 1935, 1940, and 1945 are not described in detail here. In general, methods for computing a score for a match, adding matches to the match list, accumulating information about matches, determining whether more matches or documents are needed, and ranking the match list proceed similarly in those embodiments of the invention that do and do not use contexts.

Returning now to step 1920, to identify matches among contexts represented as FSAs, the query is used as the input to the FSAs that represent the contexts. In performing the matching, each state of the FSA is considered as an initial state. Likewise, each state of the FSA is considered a final state. The query is provided as input to an initial state of the FSA. The FSA processes the terms in the query sequentially, proceeding from one state m to a next state n if the term being processed is identical to a label on an outgoing arc of state m that terminates at state n. In other words, a specified term in the query only triggers a transition from state m to state n if an arc labeled with that term extends from state m to state n. A partially unspecified term triggers a transition from state m to state p if an arc labeled with the restriction associated with the partially unspecified term extends from state m to state p or if a combination of arcs labeled with equivalent restrictions extend from state m to state p. Note that in the case of a partially unspecified term states m and p need not be consecutive within the FSA. In other words, a partially unspecified term can trigger a transition between two states that are separated by one or more intervening states. This feature corresponds to the fact that a partially unspecified term in a query can match either a single specified term or a group of specified terms in a context. A wholly unspecified term triggers a transition from state m to state n regardless of the label on the arc(s) extending from state m to state n. In the case of a wholly unspecified term the states must be consecutive. If the context contains a match for the query, then each term in the query (presented in same order as in the query) is able to trigger a successful transition. If the context does not contain a match for the query then the FSA is unable to process the entire query. The query is provided as input to each state in the FSA until either a match is found (i.e., every term in the query has been successfully processed) or the query has been provided to every state unsuccessfully. Once a portion of an FSA that accepts a partially unspecified query is identified, the sequence of specified terms that label the arcs of that subportion constitutes a match for the query. For example, if the query _[PROPER NAME] invented the telephone is used as input to the FSA shown in FIG. 15, then the input_[PROPER NAME] triggers a transition from state 1 to state 3; and the inputs invented, the, and telephone trigger transitions from state 3 to state 4, from state 4 to state 5, and state 5 to state 6. Since state 6 is a final state, the FSA accepts the query. The sequence of specified terms that is encompassed by the arcs that correspond to the query, namely Alexander Bell invented the telephone, is a match for the query. In this fashion step 1920 identifies matches for a query among a set of contexts stored as FSAs.

Figure 20:
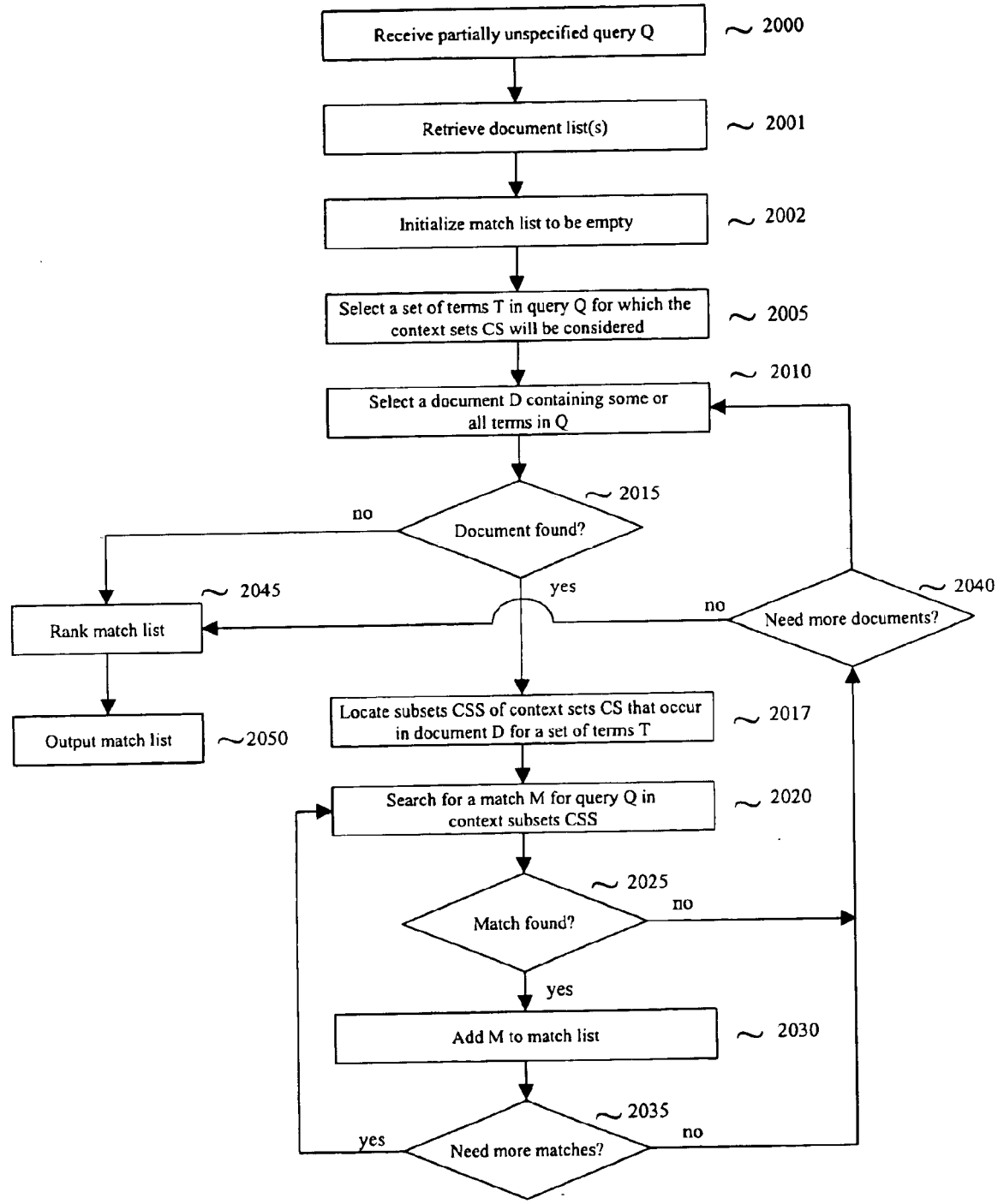
FIG. 20 is a flow diagram showing a generalization of FIG. 19.

FIG. 20 illustrates a generalization of the method used by match engine 34 in a case in which the index stores type I context sets for terms. This method is similar to that illustrated in FIG. 19 with the exception of steps 2005, 2017, and 2020 which correspond to steps 1905, 1917, and 2020 of FIG. 19. In particular, in the more general method of FIG. 20, rather than the contexts will be considered, step 2005 selects a set of terms TS for which the contexts will be considered. Then, in step 2017, rather than locating a context subset CSS of the context set for a single term that occurs in document D, context subsets CSS' are located for multiple terms in the set of terms TS. Then, in step 2020, one or more of these context subsets may be searched for matches as described above. The resulting set of matches found in a document D is the union of the sets of matches located within the context subsets for the multiple terms. Searching for matches within context subsets for each of a set of terms rather than the context subsets for a single term increases the number of matches that can be located. In particular, this generalization addresses the fact that a context must be of finite length. For example, consider the string that may appear in a document:

The state of California is famous for its wine and its climate.

In a case that a context for term T is defined as the string including three terms on either side of T, a context for the term California would be The state of California is famous for. A context for the term famous would be of California is famous for its wine. Then the query California is famous for _[NP]

does not have a match within the context for California, since there is no term within this context to satisfy the [NP] restriction. However, the query does have a match within the context for famous, since the string California is famous for its wine matches the four specified terms within the query, and the terms its wine satisfies the [NP] restriction. As this simple example shows, searching the context sets for multiple terms in the query expands the possibilities for finding matches. This fact becomes increasingly important when the number of terms in the query approaches the number of terms in the contexts. Whether to search context subsets for a single term or whether to search context subsets for multiple terms can be decided during a query preprocessing phase (e.g., based on the length of the query) or during the process of accumulating matches (e.g., based on the number of matches found thus far).

Figure 21:
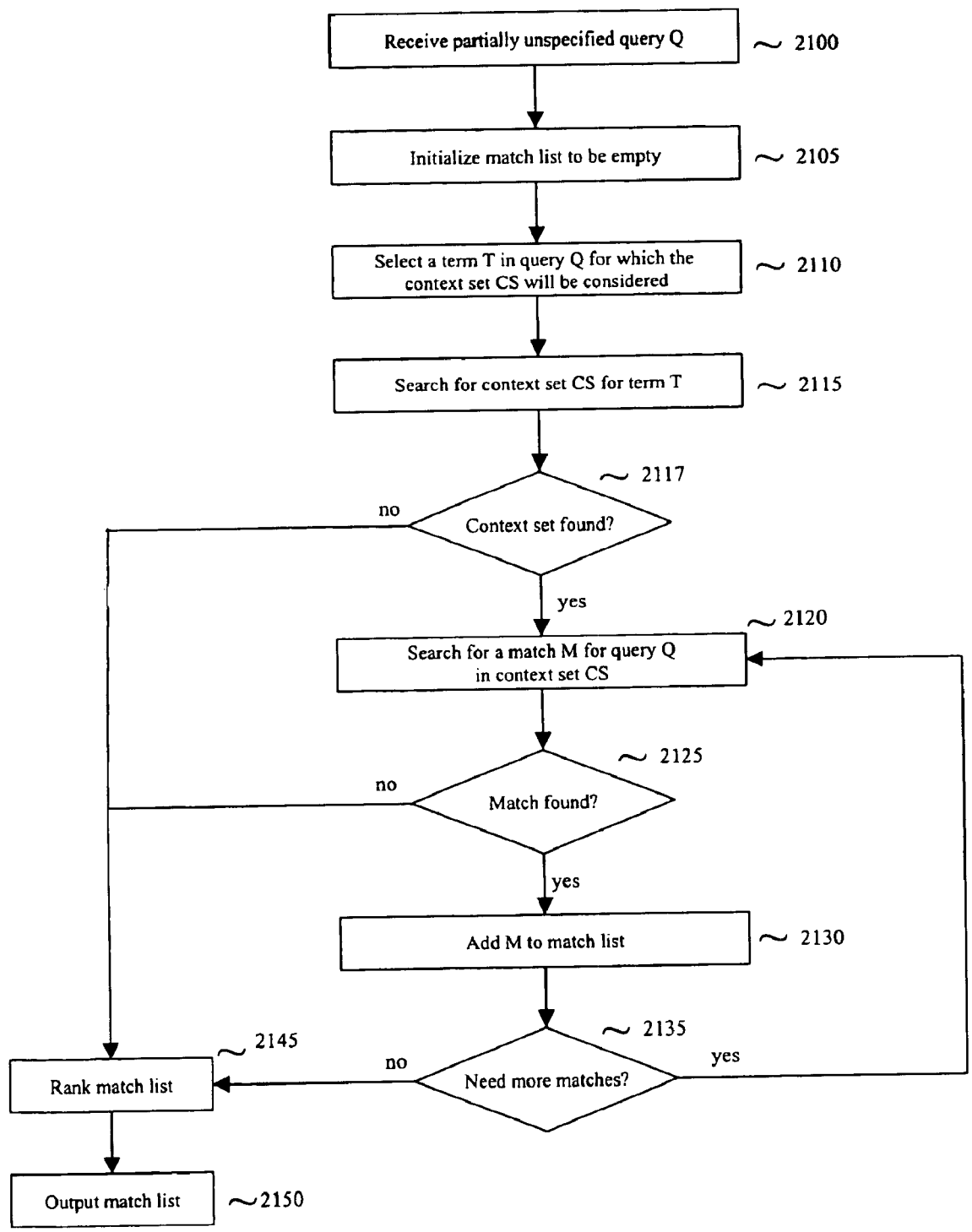
FIG. 21 is a flow diagram showing process steps for locating matches for a partially unspecified query within a set of contexts and for generating and ranking a match list for the query.

FIG. 21 illustrates the operation of match engine 34 and ranking module 36 in a case in which the index stores type II context sets for terms. As described above, the type II context set for a term T contains contexts for the term extracted from a plurality of documents, however the information about which document contains a particular context is not retained. Thus the contexts for a term consist of a single context set CS rather than multiple context subsets corresponding to different documents. Referring to FIG. 21, in step 2100 match engine 34 receives a query Q. In certain preferred embodiments of the invention the query is partially unspecified although this need not be the case. In step 2105, the match list is initialized to be empty. In step 2110, match engine 34 selects a term T in query Q for which the context set CS will be considered. In step 2115, match engine 34 searches for the context set CS for term T. Following decision step 2117, if a context set for term T is found then in step 2120 context set CS is searched for a match M for query Q. At decision step 2125, if a match M has been found processing proceeds to step 2130. In step 2130 the match is added to the match list preferably along with an associated score as described previously. At decision step 2135, if more matches are needed processing returns to step 2120. Steps 2120 through 2135 are repeated until either no more matches can be found within context set CS or match engine 34 determines that no more matches are needed. In either case, match engine 34 proceeds to step 2140. In step 2140 ranking module 36 ranks the assembled match list, and the match list is output in step 2150. Returning to step 2117, if no context set for term T can be found, processing proceeds immediately to step 2140, and an empty match list is output. Steps 2130, 2135, and 2140 are performed in a similar fashion to corresponding steps 1230, 1235, and 1245 described above. In general, methods for computing a score for a match, adding matches to the match list, accumulating information about located matches, and determining whether more matches or documents are needed, and ranking the match list proceed similarly in those embodiments of the invention that do and do not use contexts.

Figure 22:
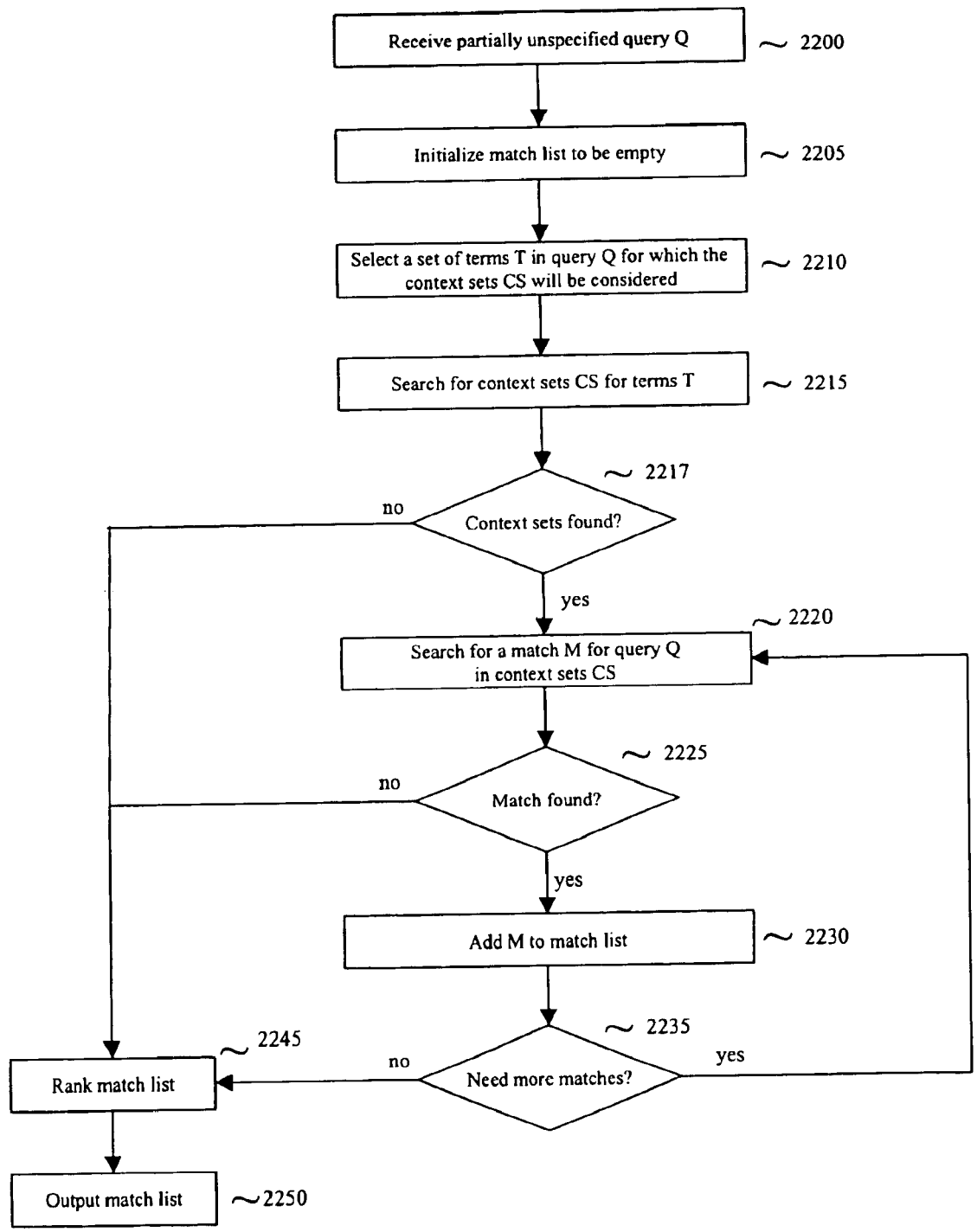
FIG. 22 is a flow diagram showing a generalization of FIG. 21.

FIG. 22 illustrates a generalization of the method used by match engine 34 in a case in which the index stores type II context sets for terms. This method is similar to that illustrated in FIG. 21 with the exception of steps 2205, 2217, and 2220. In particular, in the more general method of FIG. 22, rather than selecting a single term T for which the contexts will be considered, step 2205 selects a set of terms TS for which the contexts will be considered. Then, in step 2217, rather than locating a context set CS for a single term, a group of context sets CS' may be located for multiple terms in the set of terms TS. Then, in step 2220, one or more of these context sets may be searched for matches as described above. In the case that multiple context sets are starched, the resulting set of matches is the union of the sets of matches located within the context sets. As in the case described above in which the index stores type I context sets for terms, searching for matches within context sets for each of a set of terms rather than only within the context set for a single term increases the number of matches that can be located and reduces the likelihood that an empty match list will be returned.

The foregoing descriptions have assumed that the contexts for a term T include the term and have not considered the case in which a context C is stored as left and right contexts $C_L$ and $C_R$. In such a case a variation on the matching method described above reduces the amount of processing needed to identify matches. Specifically, if left and right contexts are available, after selection of a term T for which the set of contexts is to be searched, query Q is split into left and right portions $Q_L$ and $Q_R$. The left portion consists of those terms in the query to the left of T, and the right portion consists of those terms in the query to the right of T. Then the left contexts for term T are searched to identify matches for $Q_L$. If a match for $Q_L$ is found in a context $C_L$, the corresponding right context $C_R$ is searched to determine whether it contains a match for $Q_R$. Note that these searches may be carried out in the opposite order. In other words, the right contexts for term T can be first searched to identify matches for $Q_R$. If a match for $Q_R$ is identified in context $C_R$, context $C_L$ is searched to determine whether it contains a match for $Q_R$. Of course all left contexts can be searched for matches for $Q_L$ before searching the corresponding right contexts for matches for $Q_R$ (or vice versa).

In order for a context C consisting of a right context $C_R$ and a left context $C_L$ to contain a match for Q, it is not sufficient merely that $C_R$ contains a match for $Q_R$ and that $C_L$ contains a match for $Q_L$. In addition, the portion of $C_R$ that matches $Q_R$ (assuming that both CR and $Q_R$ are considered in a right to left order) and the portion of $C_L$ that matches $Q_L$ (assuming that both $C_L$ and $Q_L$ are considered in a left to right order) must begin with the terms that flank term T in the complete context C. This must be the case so that, when bridged by the term T, the portions of $C_R$ and $C_L$ that match $Q_R$ and $Q_L$ form a match for the complete query Q. To ensure that this is the case, when searching a right context $C_R$ for a match for $Q_R$, the terms in $Q_R$ are considered in a left to right order beginning with the first term to the right of T, and searching proceeds from left to right within $C_R$ beginning with the first term to the right of T. When searching a left context $C_L$ for a match for $Q_L$, the terms in $Q_L$ are considered in a right to left order beginning with the first term to the left to T, and searching proceeds from right to left within $C_L$ beginning with the first term to the left of T. In the preferred embodiments of the invention in which left and right contexts are stored as FSAs, only the first state (leftmost state) of the FSAs representing right contexts needs to be considered as an initial state. In other respects, the FSAs representing right contexts process the right portion of a query Q as described above in the situation in which an FSA represents a complete context and processes a complete query Q (e.g., arcs extend from left to right and input terms trigger transitions from left to right). In the case of an FSA representing a left context, only the last state (rightmost state) needs to be considered as an initial state. FSAs representing left contexts operate "backwards" when processing a left portion of a query Q. In other words, the arcs extend from right to left, and input terms trigger transitions from right to left. By eliminating the need to consider every state of the FSA representing a context as an initial state, storing the contexts as left and right contexts results in a considerable reduction in the amount of processing necessary to identify a match. Since a right or left context is on average approximately half the length of a complete context, additional savings occur if a context can be eliminated from consideration by searching only a right or left portion rather than both portions. Similar savings result when contexts are represented using alternative methods.

As discussed above, storing contexts for terms facilitates the process of identifying matches for queries. The foregoing description has been directed primarily to the use of contexts for providing a result for a partially unspecified query. It is noted that the use of contexts is not limited to finding matches for partially unspecified queries. Instead, the strategy of searching contexts rather than searching a body of information from which the contexts are obtained, is also applicable to queries consisting only of one or more fully specified terms. In such a case the results for the query may be the actual contexts in which the query terms appear, or portions thereof. In those embodiments of the invention in which document information for the contexts is retained, the results can include or consist of document identifiers and/or locations. The use of contexts offers a number of advantages. For example, it affords a convenient way of searching for phrases and/or for documents that contain a phrase including one or more terms, where a phrase refers to a sequence of one or more terms that must appear in a specific order. As discussed in the Background, prior art systems suffer various limitations in this regard.

It will be appreciated that the use of contexts to provide a result for a query is not limited to finding matches for the query as described above. Instead, any of a variety of searching approaches including Boolean searches, searches involving proximity operators, etc., can be applied to contexts. Such searching techniques are well known in the art. However, in the prior art such techniques have typically been applied to documents. In such a case it is necessary to access a document in which a search term or terms appear in order to obtain additional information about surrounding terms. The use of contexts provides a means of avoiding this step. Thus the present invention provides a method of fulfilling an information need expressed in a query comprising searching for information within contexts that include one or more terms in the query.

Ranking

As mentioned above, regardless of whether matches are located within documents or within contexts, match engine 34 assigns a score to each located match and adds the match to the match list. In certain embodiments of the invention the score is simply a running total of the number of occurrences of the match within the documents or context sets being searched. When match engine 34 encounters a match it searches the match list to determine whether that match has been previously added to the match list. If so, another copy of the match is not added to the match list but rather the score for the match is incremented. Thus, when the matching process is completed (e.g., when match engine 34 determines that sufficient matches have been found, that sufficient documents and/or contexts have been searched, or when all available documents or context sets have been searched) the score reflects the frequency of the match across a plurality of documents.

Ranking module 36 then uses the score to order the match list. In the simplest case, the ranking correlates directly with the score. In such a case the ranked match list may begin with the match with the highest score and progress to matches with lower scores. Thus a match that was located 500 times would appear before a match that was located 400 times, which would in turn appear before a match that was located 200 times. In certain embodiments of the invention the ranking is implicit in the order of the match list itself after the process of identifying matches is complete. For example, match engine 34 can reorder the match list on the fly, as new matches are identified or as additional instances of previously identified matches are identified. As mentioned above, traditional search and query systems locate documents that contain query term(s) and rank the documents based on the number of occurrences of the term(s) within the documents. In contrast, the present invention provides information (i.e., matches) that is relevant to a query rather than merely providing identifiers for documents that contain the query terms and thus may contain the desired information. Furthermore, in preferred embodiments of the invention the ranking of the matches reflects the occurrence of the information among a plurality of documents rather than within a single document. The ranking feature provides a basis on which the user and/or the system can assign a confidence level to the information. For example, consider the query Agatha Christie was born in _[NUM] discussed above. Assuming that the phrases Agatha Christie was born in 1890 and Agatha Christie was born in 1980 occur in documents in the database, both of these phrases (or both the numbers 1890 and 1980) will appear in the match list. However, in a database containing a large number of documents it is likely that the first phrase, expressing the correct information that Agatha Christie was born in 1890, will appear much more frequently than an incorrect phrase such as the second phrase. Thus the match containing the correct information will be ranked higher than matches containing the incorrect information. By ranking the matches based on their frequency among a plurality of documents, in cases such as this the invention permits a distinction between correct information and incorrect information. Of course, in many situations a variety of different phrases may contain correct and/or appropriate information.

In some cases users may be particularly interested in rare or unusual matches. In addition, users may have an explicit interest in learning the order of the matches. For example, if the query _[NAME] is matched against a database consisting of Web pages, the query results would include an ordered list of the most popular or famous people mentioned on the Web.

Results Pase Generation and Output

After the match list is ranked (or without ranking in those embodiments of the invention that do not include ranking), it is passed to results page generator 38. The results page generator processes the results for display to a user or for input to another computer program. In those embodiments of the invention in which ranking is performed, matches are formatted and presented in an order corresponding to the ranked match list. Otherwise matches can be presented in any of a variety of orders. Information about the match such as the actual score and/or an indication of the frequency of the match relative to other matches is displayed in certain embodiments of the invention. As mentioned previously, in certain embodiments of the invention rather than displaying the complete match the system displays only that portion of a match that corresponds to one or more unspecified terms in the query. In certain embodiments of the invention results page generator 38 formats the results as a Web page for presentation by a Web browser.

In certain embodiments of the invention, in addition to the matches themselves, one or more document identifiers are displayed below or adjacent to the matches that occur within the documents, as shown in FIG. 6. In the case of Web pages, the document identifier is preferably the URL of the Web page in which the match occurs. The URL may serve as a link to the Web page, thereby allowing the user to conveniently access the Web page if desired. Information about documents such as document language, age of the document, etc., may also be presented in the results. When document identifiers or other document-related information is included in results that are displayed to a user, preferably the document information is displayed adjacent to or below the match itself, so that the user may readily determine the identity of documents that contain a particular match. If the match occurs in more than one document, the set of documents that contain a particular match (or a portion of the set) can be displayed. The documents that contain a particular match are preferably displayed in an order corresponding to the number of instances of the match within the document. In other words, in addition to ranking the matches, the documents that contain a given match are themselves ranked. Thus for any given match, documents that contain a greater number of instances of the match are presented above documents that contain fewer instances of the match. The actual number of instances of a given match within a document can also be presented. As mentioned above, such information may be stored by match engine 34 during the process of match accumulation. Alternatively, this information may be obtained after the process of matching is complete, e.g., by ranking module 36 or results page generator 38. Of course other criteria such as the document's age or source, and/or the position or features of matches identified within the document can be used in addition to or instead of the number of matches identified within the document in order to rank the document. Preferably the documents are displayed in a format suggestive of a relationship between the documents and the match that they contain. For example, the documents may be listed beneath the match, adjacent to the match, or identified with an arrow or line extending from the match to the document list. In addition, in certain embodiment of the invention the results may include a fragment of text that includes the match and that also includes additional term(s) on either side of the match as they occur in a document that contains the match.

Instead of, or in addition to, presenting information that identifies documents containing a match, the invention may include information about the ranking of the match. For example, the results may include the number of documents in which the match was located, or a numerical score reflecting the relative level of confidence in the match versus other matches. Such information may help the user decide which, among multiple matches, may best fulfill the information need.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

We claim:

1. A method of fulfilling an information need based on documents and an index stored on a computer-readable medium comprising the steps of:

receiving a query containing a word and a symbol that matches any term;

identifying one or more documents in the index containing the word;

locating one or more different terms at a location of the symbol in the query within the identified one or more documents; and ranking the located one or more different terms using a metric related to the number of times in all of the identified documents the one or more terms was located, wherein the metric is the number of times the one or more terms was located in all of the identified documents.

2. The method of claim 1 wherein the index identifies documents that contain the word.

3. The method of claim 1 wherein the documents are accessible on the internet.

4. The method of claim 1 wherein the documents comprise worldwide web pages.

5. The method of claim 1 further comprising the step of outputting the ranked one or more different terms.

6. The method of claim 5 further comprising the step of outputting identifiers or locations of the documents that contain the word.

7. The method of claim 6 wherein the identifiers or location of a document comprises a uniform resource locator.

8. The method of claim 1 wherein the symbol includes a restriction that comprises a morphological feature.

9. The method of claim 1 wherein the symbol includes a restriction that comprises a syntactic feature.

10. The method of claim 1 wherein the symbol includes a restriction that comprises a computer program.

11. The method of claim 1 wherein the index includes locations of terms within the documents.

12. The method of claim 11 wherein the locating step comprises:

determining the location of a term in the query within a document using the index; and locating a term based on a location of the term within the document.

13. The method of claim 1 wherein the metric is based on the content of a plurality of documents identified in the identifying step.

14. A method of fulfilling an information need based on contexts in documents and an index stored on a computer readable medium comprising the steps of:
    receiving a query containing a word and a symbol that matches any term;
    identifying one or more documents having a context containing the word, wherein the context comprises one or more terms surrounding the word;
    locating one or more different terms at a location of the symbol in the query within the identified one or more contexts within the documents; and
    ranking the located one or more different terms using a metric related to the number of times in all of the identified documents the one or more terms was located, wherein the metric is the number of times the one or more terms was located in all of the identified documents.

15. The method of claim 14 further including storing contexts for terms wherein a context occurs in a document.

16. The method of claim 15 wherein the storing step comprises storing, for a plurality of contexts, a finite state automaton that represents the context.

17. Computer-executable process steps stored on a computer-readable medium, the computer-executable process steps to fulfill an information need based on documents and an index also stored on a computer-readable medium, the computer-executable process steps comprising:
    code to receive a query containing a word and a symbol that matches any term;
    code to identify one or more documents in the index containing the word;
    code to locate one or more different terms at a location of the symbol in the query within the identified one or more documents; and
    code to rank the located one or more different terms using a metric related to the number of times in all of the identified documents the one or more terms was located, wherein the metric is the number of times the one or more terms was located in all of the identified documents.

\* \* \* \* \*